US007888278B2

(12) United States Patent
Rapier et al.

(10) Patent No.: US 7,888,278 B2
(45) Date of Patent: Feb. 15, 2011

(54) STABILIZED ALUMINA SUPPORTS, CATALYSTS MADE THEREFROM, AND THEIR USE IN PARTIAL OXIDATION

(75) Inventors: Charles R. Rapier, Ponca City, OK (US); Shuibo Xie, Ponca Ciy, OK (US); Baili Hu, Ponca City, OK (US); Beatrice C. Ortego, Ponca City, OK (US); David E. Simon, Bartlesville, OK (US); David M. Minahan, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 1537 days.

(21) Appl. No.: 10/706,645

(22) Filed: Nov. 12, 2003

(65) Prior Publication Data

US 2004/0138060 A1    Jul. 15, 2004

Related U.S. Application Data

(60) Provisional application No. 60/501,185, filed on Sep. 8, 2003, provisional application No. 60/425,383, filed on Nov. 11, 2002, provisional application No. 60/425,381, filed on Nov. 11, 2002.

(51) Int. Cl.
    *C04B 35/50*    (2006.01)
(52) U.S. Cl. .................................... 501/152; 501/153
(58) Field of Classification Search ................. 501/152, 501/153
    See application file for complete search history.

(56) References Cited

U.S. PATENT DOCUMENTS

| 3,752,775 | A |   | 8/1973 | Yamaguchi et al. ......... 252/464 |
| 4,151,123 | A |   | 4/1979 | McCann, III ............... 252/462 |
| 4,537,873 | A |   | 8/1985 | Kato et al. .................. 502/242 |
| 4,585,752 | A |   | 4/1986 | Ernest ........................ 502/314 |
| 4,738,946 | A |   | 4/1988 | Yamashita et al. ......... 502/303 |
| 4,793,797 | A | * | 12/1988 | Kato et al. ..................... 431/7 |
| 4,906,176 | A | * | 3/1990 | Yamashita et al. ............ 431/7 |
| 4,961,786 | A |   | 10/1990 | Novinson .................... 106/692 |
| 5,736,482 | A |   | 4/1998 | Durand et al. ............... 502/303 |
| 5,837,634 | A |   | 11/1998 | McLaughlin et al. ......... 501/127 |
| 6,015,285 | A | * | 1/2000 | McCarty et al. ................ 431/7 |
| 6,399,528 | B1 |   | 6/2002 | Krell et al. .................... 501/80 |
| 6,455,597 | B2 |   | 9/2002 | Hohn et al. ................... 518/715 |
| 6,830,596 | B1 | * | 12/2004 | Deckman et al. ............... 48/95 |
| 2003/0032554 | A1 |   | 2/2003 | Park et al. .................... 502/302 |

OTHER PUBLICATIONS

PCT International Search Report for Appln. No. PCT/US03/36051, dated May 4, 2004; (3 p.).

(Continued)

*Primary Examiner*—Jessica L Ward
*Assistant Examiner*—Paul A Wartalowicz

(57) ABSTRACT

The present invention relates to stabilized supports stable at temperatures above 800° C., and method of preparing such supports, which includes adding a rare earth metal to an aluminum-containing precursor prior to calcining. The present invention can be more specifically seen as a support, process and catalyst wherein the stabilized alumina catalyst support comprises a rare earth aluminate with a molar ratio of aluminum to rare earth metal greater than 5:1 and, optionally, an aluminum oxide. More particularly, the invention relates to the use of catalysts comprising rhodium, ruthenium, iridium, or combinations thereof, loaded onto said stabilized supports for the synthesis gas production via partial oxidation of light hydrocarbons, and further relates to gas-to-liquids conversion processes.

81 Claims, 3 Drawing Sheets

OTHER PUBLICATIONS

Amato et al., *Sintering of Pelleted Catalysts for Automotive Emission Control*, pp. 187-197, (1975).
Arai et al., *Recent Progress in High-Temperature Catalytic Combustion*, Catalysis Today, 10 (1991) pp. 81-94.
Arai et al., *Thermal Stabilization of Catalyst Supports and their Application to High-Temperature Catalytic Combustion*, Applied Catalysis A: General 138 (1996) pp. 161-176.
Artizzu-Duart et al, *Catalytic Combustion of Methane on Substituted Barium Hexaaluminates*, Catalysis Today 59 (2000) pp. 163-177.
Beguin et al., *Stabilization of Alumina by Addition of Lanthanum*, Applied Catalysis 75 (1991) pp. 119-132.
Bish et al., *Quantitative Phase Analysis Using the Rietveld Method*, J. Appl. Cryst. (1998) 21, pp. 86-91.
Cai et al., *Atomic Scale Mechanism of the Transformation of y-Alumina to O-Alumina*, Physical Review Letters, vol. 89, No. 23, (Dec. 2, 2002) pp. 235501-1-235501-4.
Chen et al., *High Temperature Thermal Stabilization of Alumina Modified by Lanthanum Species*, Applied Catalysis A: General 205 (2001) pp. 159-172.
Dexpert-Ghys, *Optical and Structural Investigation of the Lanthanum β-Alumina Phase Doped with Europium*, Journal of Solid State Chemistry 19, (1976) pp. 193-204.
Farrington et al., *The Lanthanide β Alumina*, Applied Physics A 32 (1983) pp. 159-161.
Groppi et al., *Preparation and Characterization of Hexaaluminate-Based Materials for Catalytic Combustion*, Applied Catalysis A: General, 104 (1993) pp. 101-108.
Jang et al., *Catalytic Oxidation of Methane Over Hexaaluminates and Hexaaluminate-Supported Pd Catalysts*, Catalysis Today 47 (1999) pp. 103-113.
Johansson et al., *Development of Hexaaluminate Catalysts for Combustion of Gasified Biomass in Gas Turbines*, Journal of Engineering for Gas Turbines and Power, vol. 124 (Apr. 2002) pp. 235-238.
Kato et al., *Preparation of Lanthanum β-Alumina with High Surface Area by Coprecipitation*, Journal of the American Ceramic Society, 70 [7] (Jul. 1987) pp. C-157-C-159.
Levy et al., *The Effect of Foreign Ions on the Stability of Activated Alumina*, Journal of Catalysis 9 (1967) pp. 76-86.
Liu et al., *Partial Oxidation of Methane over Nickel Catalysts Supported on Various Aluminas*, Korean Journal of Chemical Engineering 19 (5) pp. 735-741 (2002).
Liu et al., *Partial Oxidation of Methane over Ni/Ce-ZrO$_2$/0-Al$_2$O$_3$*, Korean Journal of Chemical Engineering 19(5) pp. 742-748 (2002).
Machida et al., *Effect of Additives on the Surface Area of Oxide Supports for Catalytic Combustion*, Journal of Catalysts 103 (1987) pp. 385-393.
Machida et al., *Analytical Electron Microscope Analysis of the Formation of BaO—6Al$_2$O$_3$*. Journal of American Ceramic Society 71[12] pp. 1142-1147 (1988).
Machida et al., *Effect of Structural Modification on the Catalytic Property of Mn-Substituted Hexaaluminates*, Journal of Catalysis 123 (1990) pp. 477-785.
Matsuda et al., *8th International Congress on Catalysis vol. IV: Impact of Surface Science on Catalysis Structure-Selectivity/Activity Correlations New Routes for Catalyst Synthesis* (pp. IV-879-IV-889), (1984).
Miao et al., *Partial Oxidation of Methane to Syngas over Nickel-Based Catalysts Modified by Alkali Metal Oxide and Rare Earth Metal Oxide*, Applied Catalysts A: General 154 (1997) pp. 17-27.
Nair et al., *Pore Structure Evolution of Lanthana-Alumina Systems Prepared through Coprecipitation*, Journal of American Ceramic Society 83[8] (2000) pp. 1942-1946.
Oudet et al., *Thermal Stabilization of Transition Alumina by Structural Coherence with LnAlO$_3$(Ln=La, Pr, Nd)*, Journal of Catalysis 114, (1998) pp. 112-120.
Rahkeev et al., *Transition Metal Atoms on Different Alumina Phases: The Role of Subsurfaces Sites on Catalytic Activity*, Physical Review B 67, 115414 (2003) p. 4.
Rietveld, *A Profile Refinement Method for Nuclear and Magnetic Structures*, Journal of Appl. Cryst. (1969) 2, pp. 65-71.
Roh et al., *Partial Oxidation of Methane over Ni/0-Al$_2$O$_3$ Catalysts*, Chemistry Letters 2001 (pp. 666-667), (2001).
Santos et al., *Standard Transition Aluminas, Electron Microscopy Studies*, Materials Research, vol. 3 No. 4 (2000) pp. 104-114.
Schaper et al., *The Influence of Lanthanum Oxide on the Thermal Stability of Gamma Alumina Catalyst Supports*, Applied Catalysis 7 (1983) pp. 211-220.
Schaper et al., *Thermal Stabilization of High Surface Area Alumina*, Solid State Ionics 16 (1985) pp. 261-266.
Seo et al., *Experimental and Numerical Studies on Combustion Characteristics of a Catalytically Stabilized Combustor*, Catalysis Today 59 (2000) pp. 75-86.
Russell et al., *Thermal Transformations of Aluminas and Alumina Hydrates*, Industrial and Engineering Chemistry vol. 42, No. 7 (1950) pp. 1398-1403.
Subramanian et al., *Characterization of Lanthana/Alumina Composite Oxides*, Journal of Molecular Catalysts, 69 (1991) pp. 235-245.
Taylor, *Computer Programs for Standardless Quantitative Analysis of Minerals Using the Full Powder Diffraction Profile*, Powder Diffraction, vol. 6, No. 1 (1991) pp. 2-9.
Tietz et al., *Investigations on Lanthanide-ion-exchanged β and β-Alumina*, Journal of Alloys and Compounds, 192 (1993) pp. 78-80.
Tijburg et al., *Application of Lanthanum to Psuedo-Boehmite and y-Al$_2$O$_3$,*, Chapman and Hall (1991) pp. 6479-6486.
Weng et al., *Mechanistic Study of Partial Oxidation of Methane to Syngas Using In Situ Time-Resolved FTIR and Microprobe Raman Spectroscopies*, The Chemical Record vol. 2, pp. 102-113 (2002).
Wu et al., *Coupled Thermodynamic-Phase Diagram Assessment of the Rare Earth Oxide-Aluminium Oxide Binary Systems*, Journal of Alloys and Compounds, 179 (1992) pp. 259-287.
Zhou et al., *Structures and Transformation Mechanisms of the n, y and 0 Transition Aluminas*, International Union of Crystallography (1991) pp. 617-630.

\* cited by examiner

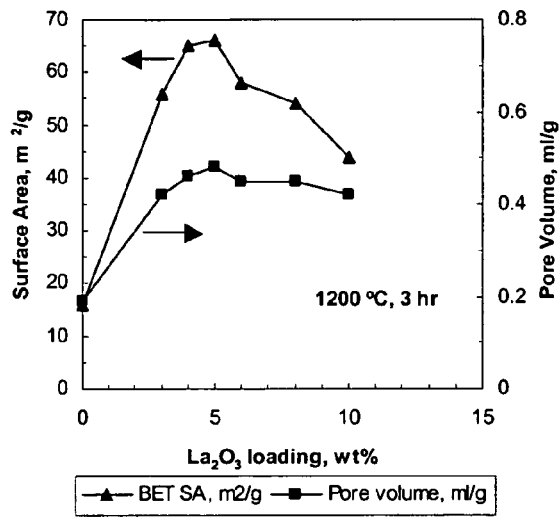 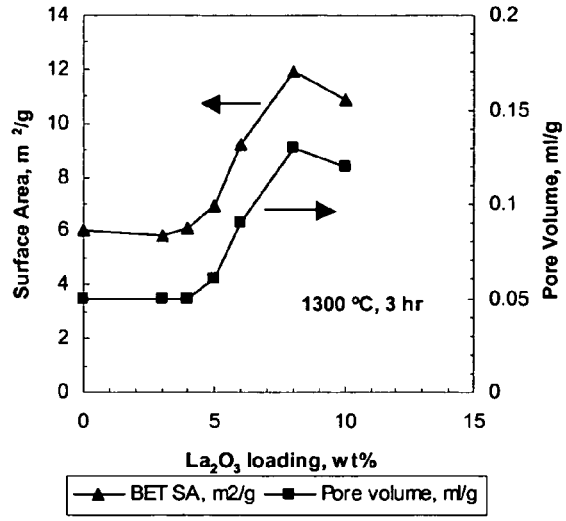
Fig. 3a
Fig. 3b
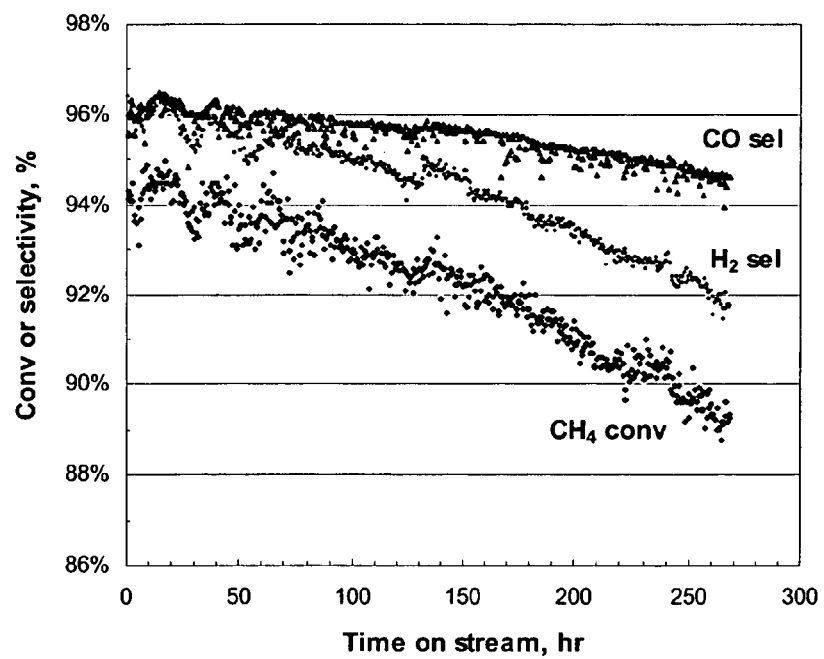
Fig. 4

STABILIZED ALUMINA SUPPORTS, CATALYSTS MADE THEREFROM, AND THEIR USE IN PARTIAL OXIDATION

CROSS-REFERENCE TO RELATED APPLICATIONS

The present application claims the benefit of 35 U.S.C. 111(b) U.S. Provisional Application Ser. No. 60/425,381 filed Nov. 11, 2002, entitled "Novel Syngas Catalysts and Their Method of Use", U.S. Provisional Application Ser. No. 60/425,383 filed Nov. 11, 2002, entitled "Improved Supports for High Surface Area Catalysts" and U.S. Provisional Application Ser. No. 60/501,185 filed Sep. 8, 2003, entitled "Stabilized Alumina Supports, Catalysts Made Therefrom, And Their Use in Partial Oxidation" and which are hereby incorporated by reference herein for all purposes.

STATEMENT REGARDING FEDERALLY SPONSORED RESEARCH OR DEVELOPMENT

Not applicable.

TECHNICAL FIELD OF THE INVENTION

The present invention generally relates to catalyst supports having high surface area and stability in ultra high temperature conditions and also to the catalytic conversion of light hydrocarbons (e.g., natural gas) to produce synthesis gas.

BACKGROUND OF THE INVENTION

It is well known that the efficiency of supported catalyst systems is often related to the surface area on the support. This is especially true for systems using precious metal catalysts or other expensive catalysts. The greater the surface area, the more catalytic material is exposed to the reactants and the less time and catalytic material is needed to maintain a high rate of productivity.

Alumina ($Al_2O_3$) is a well-known support for many catalyst systems. It is also well known that alumina has a number of crystalline phases such as alpha-alumina (often noted as α-alumina or $α-Al_2O_3$), gamma-alumina (often noted as γ-alumina or $γ-Al_2O_3$) as well as a myriad of alumina polymorphs. One of the properties of gamma-alumina is that it has a very high surface area. This is commonly believed to be because the aluminum and oxygen molecules are in a crystalline structure or form that is not very densely packed. Gamma-$Al_2O_3$ is a particularly important inorganic oxide refractory of widespread technological importance in the field of important inorganic oxide refractory of widespread technological importance in the field of catalysis, often serving as a catalyst support. Gamma-$Al_2O_3$ is an exceptionally good choice for catalytic applications because of a defect spinel crystal lattice that imparts to it a structure that is both open and capable of high surface area. Moreover, the defect spinel structure has vacant cation sites giving the gamma-alumina some unique properties. Gamma-alumina constitutes a part of the series known as the activated, transition aluminas, so-called because it is one of a series of aluminas that can undergo transition to different polymorphs. Santos et al. (Materials Research, 2000; vol. 3 (4), pp. 104-114) disclosed the different standard transition aluminas using Electron Microscopy studies, whereas Zhou et al. (Acta Cryst., 1991, vol. B47, pp. 617-630) and Cai et al. (Phys. Rev. Lett., 2002, vol. 89, pp. 235501) described the mechanism of the transformation of gamma-alumina to theta-alumina.

The oxides of aluminum and the corresponding hydrates, can be classified according to the arrangement of the crystal lattice; $γ-Al_2O_3$ being part of the γ series by virtue of a cubic close packed (ccp) arrangement of oxygen groups. Some transitions within a series are known; for example, low-temperature dehydration of an alumina trihydrate (gibbsite, γ-Al $(OH)_3$) at 100° C. provides an alumina monohydrate (boehmite, γ-AlO(OH)). Continued dehydration at temperatures below 450° C. in the γ series leads to the transformation from boehmite to the completely dehydrated $γ-Al_2O_3$. Further heating may result in a slow and continuous loss of surface area and a slow conversion to other polymorphs of alumina having much lower surface areas. Higher temperature treatment ultimately provides $α-Al_2O_3$, a denser, harder oxide of aluminum often used in abrasives and refractories. Unfortunately, when gamma-alumina is heated to high temperatures, the structure of the atoms collapses such that the surface area decreases substantially. The most dense crystalline form of alumina is alpha-alumina. Thus, alpha-alumina has the lowest surface area, but is the most stable at high temperatures. The structure of alpha-alumina is less well suited to certain catalytic applications, such as in the Fischer-Tropsch process because of a closed crystal lattice, which imparts a relatively low surface area to the catalyst particles.

Alumina is ubiquitous as supports and/or catalysts for many heterogeneous catalytic processes. Some of these catalytic processes occur under conditions of high temperature, high pressure and/or high water vapor pressure. The prolonged exposure to high temperature typically exceeding 1,000° C., combined with a significant amount of oxygen and sometimes steam can result in catalyst deactivation by support sintering. The sintering of alumina has been widely reported in the literature (see for example Thevenin et al, Applied Catalysis A: General, 2001, vol. 212, pp. 189-197) and the phase transformation due to an increase in operating temperature is usually accompanied by a sharp decrease in surface area. In order to prevent this deactivation phenomenom, various attempts have been made to stabilize the alumina support against thermal deactivation (see Beguin et al., Journal of Catalysts, 1991, vol. 127, pp. 595-604; Chen et al., Applied Catalysis A: General, 2001, vol. 205, pp. 159-172).

The research focusing on the thermal stabilization of alumina led to the development of high temperature-resistant materials such as hexaaluminates (Matsuda et al., $8^{th}$ International Congress on Catalysis Proceedings, Berlin, 1984, vol. 4, pp. 879-889; Machida et al., Chemistry Letters, 1987, vol. 5, pp. 767-770) and the investigation of other potential oxide materials such as perovskites, spinels, and garnets, which have been examined with respect to both the thermal stability and catalytic performance.

Hexaaluminate structures have been shown to be effective structures for combustion catalysts because they provide excellent thermal stability and a higher surface area than alpha-alumina. Of particular interest, Arai and coworkers in Japan have developed hexaaluminates and substituted hexaaluminates as combustion catalysts (Arai & Machida, Catalysis Today, 1991, vol. 10, pp. 81-95), and showed that the most promising stabilizer for combustion catalysts was barium (Arai & Machida, Applied Catalysis A: General, 1996, vol. 138, pp. 161-176). The investigation of the hexaaluminate material for the use of combustion has been described for example in Machida et al. (Journal of Catalysis, 1990, vol. 123, pp. 477-485) and in Groppi et al. (Applied Catalysis A: general, 1993, vol. 104, pp. 101-108). Machida et al. (Journal of American Ceramic Society, 1988, vol. 71, pp. 1142-1147) discovered that the crystal growth of one type of hexaaluminates, beta-alumina, also known as magnetoplumbite, was quite slow and anisotropic, and they proposed that its anisotropic growth may be the reason why the hexaaluminate can retain a large surface area at elevated temperatures. Arai and Machida (Catalysis Today, 1991, vol. 10, pp. 81-95) also disclosed that the thermal resistance of hexaaluminates seems to be quite dependent on the preparation procedures, primarily due to the difference of formation mechanism of hexaaluminates in various procedures. Kato et al. (Journal of American Ceramic Society, 1987, vol. 71(7), pp. C157-C159) disclosed a co-precipitation method to prepare mixtures of lanthanum and aluminum precursors, which resulted in formation of lanthanum beta-alumina structures with high surface area.

Destabilization of the support is not the sole cause of catalyst deactivation at high temperature. Stabilizing the catalytically active species on a thermally stable support is also needed. When an active species is supported on an oxide support, solid state reactions between the active species and the oxide support can take place at high temperature, creating some instability. That is why Machida et al. (Journal of Catalysis, 1989, vol. 120, pp. 377-386) proposed the introduction of cations of active species through direct substitution in the lattice site of hexaaluminates in order to suppress the deterioration originating from the solid state reaction between the active species and the oxide support. These cation-substituted hexaaluminates showed excellent surface area retention and high catalytic activity (see the hexaaluminate examples with Sr, La, Mn combinations in Machida et al., Journal of Catalysis, 1990, vol. 123, pp. 477-485). Therefore the preparation procedure for high temperature catalysts is critical for thermal stability and acceptable surface area.

It has long been a desire in the catalyst support arts to have a form of alumina that has high surface area like gamma-alumina and stability at high temperature like alpha-alumina. Such a catalyst support would have many uses.

One such use is in the production of synthesis gas in a catalytic partial oxidation reactor. Synthesis gas is primarily a mixture of hydrogen and carbon monoxide and can be made from the partial burning of light hydrocarbons with oxygen. The hydrocarbons, such as methane or ethane are mixed with oxygen or oxygen containing gas and heated. When the mixture comes in contact with an active catalyst material at a temperature above an initiation temperature, the reactants quickly react generating synthesis gas and a lot of heat. This very fast reaction requires only milliseconds of contact of the reactant gases with the catalyst. The combination of high exothermicity and very fast reaction time causes reactor temperatures to exceed 800° C., often going above 1,000° C. and even sometimes going above 1,200° C. Since catalysts used in the partial oxidation of hydrocarbons are typically supported, the support should be able to sustain this high thermal condition during long-term operation. In other words, a stable catalyst support which retains most of its surface area while enduring very high temperature, is desirable for long catalyst life.

The reaction pathway for partial oxidation of methane to synthesis gas is still being debated. Two alternate pathways have been proposed (Dissanayake et al., J. Catal., 1991, vol. 132, pp. 117; Jin et al., Appl. Catal., 2000, vol. 201, pp. 71; Heitne et al., Catal. Today, 1995, vol. 24, pp. 211).

Scheme 1

Scheme 2

These two pathways have come to be known as the combustion-reforming mechanism (Scheme 1), and the direct partial oxidation mechanism (Scheme 2). In Scheme 1, methane is completely oxidized to $CO_2$ and water, and CO is a result of the reforming of water and $CO_2$ with the residual methane. In Scheme 2, methane is pyrolyzed over the catalyst to produce CO directly without the pre-formation of $CO_2$.

Weng, et al. (The Chemical Record, 2002, vol. 2, pp. 102-113) reported in situ Fourier transform infrared (FTIR) studies of the catalytic partial oxidation (CPOX) mechanism of methane over rhodium and ruthenium based catalysts supported on silica and alumina. They specifically studied the influence of the catalyst pretreatment conditions, and their relationship with the concentration of oxygen species on the surface of the catalysts under reaction conditions. They concluded that a) the CPOX mechanism, whether based on Scheme 2 (i.e., -direct oxidation) or based on Scheme 1 (combustion/reforming), is determined by the amount of $O^{2-}$ on the catalyst surface; b) an oxidized catalyst, such as $Rh_2O_3$, promotes the combustion/reforming mechanism (Scheme 1), whereas rhodium in the reduced state will promote the direct pathway (Scheme 2); c) rhodium on gamma-alumina under normal feed conditions of methane to molecular oxygen ratio in the feed will contain mostly oxidized Rh, even if rhodium was pre-reduced; d) the reducibility of rhodium is greatly affected by the support; and e) a lower reduction peak temperature, as measured by temperature-programmed reduction (TPR), indicates a weaker Rh—O bond.

A weaker Rh—O bond would lead to easier removal of the surface oxygen, and therefore the lower TPR temperature peak. During normal operating conditions, a weaker Rh—O bond should promote reduced rhodium on the surface, which would favor a direct pathway. In turn, this would lead to lower catalyst surface temperatures, which should slow the alumina phase transformation to ultimately alpha-$Al_2O_3$ (also slowing deactivation).

Roh et al. (Chemistry Letters, 2001, vol. 7, pp. 666-667) reported that nickel based partial oxidation catalyst based on theta-alumina had high activity as well as high stability, and they ascribed the excellent performance of these catalyst to the combination of the strong interactions between nickel and theta-alumina and the coexistence of reduced and oxidized nickel species. Liu et al. (Korean J. Chem. Eng., 2002, vol. 19, pp. 742-748) have also shown that a protective layer between Ce—ZrO2 and theta-alumina is formed to suppress the formation of nickel-aluminate spinel structures, which would result in catalyst deactivation. Moreover Miab et al. (Appl. Catal. A, 1997, vol. 154, pp. 17-27) indicated that the modification with an alkali metal (Li, Na, K) oxide and a rare earth metal (La, Ce, Y, Sm) oxide improved the ability of a nickel catalyst on alumina to suppress carbon deposition over the catalyst during partial oxidation of methane. Therefore the type of support used and the catalytic metal-support interactions are major factors in the catalyst stability and can have an effect on the reaction mechanism.

In addition to the selection and careful preparation of the support, catalyst composition also plays an important role in catalyst activity in catalytic partial oxidation of light hydrocarbons and selectivity towards to the desired products. Noble metals typically serve as the best catalysts for the partial oxidation of methane. Noble metals are however scarce and expensive, making their use economically challenging especially when the stability of the catalyst is questionable. One of the better known noble metal catalysts for catalytic partial oxidation comprises rhodium. Rhodium-based syngas catalysts deactivate very fast due to sintering of both catalyst support and/or metal particles. Prevention of any of these undesirable phenomena is well-sought after in the art of catalytic partial oxidation process, particularly for successful and economical operation at commercial scale.

It would therefore be highly desirable to create a thermally-stable high surface area support with a metal from Groups 8, 9, or 10 of the Periodic Table of the Elements (based on the new IUPAC notation, which is used throughout the present specification), particularly with rhodium, loaded onto said support for highly productive long lifetime catalysts for the syngas production, specifically via partial oxidation.

SUMMARY OF THE INVENTION

The current invention addresses the stability and durability of catalyst supports and catalysts made therefrom for use in reactors operating at very high temperatures. Particularly the present invention relates to a high surface area aluminum-based support comprising a transition alumina phase and at least one stabilizing agent. The transition alumina phase preferably comprise theta-alumina and may contain any other alumina phases comprised between low-temperature gamma-alumina and high-temperature stable alpha-alumina. The transition alumina phase preferably comprises mainly a theta-alumina phase. The alumina support preferably may further comprise alpha-alumina; but is preferably substantially free of gamma-alumina. The stabilizing agent comprises at least one element from Groups 1-14 of the Periodic Table of Elements, and is preferably selected from the group consisting of rare earth metals, alkali earth metals and transition metals. The inventive support also is thermally stable at temperatures above 800° C.

The present invention also relates to a thermally stable aluminum-based material, which is suitable as a catalyst support for high temperature reactions. The thermally stable aluminum-based material includes a rare earth aluminate comprising at least one rare earth metal wherein the rare earth aluminate has a molar ratio of aluminum to rare earth metal (Al:Ln) greater than 5:1. The rare earth aluminate with an Al:Ln greater than 5:1 preferably comprises a lanthanide metal selected form the group consisting of lanthanum, praseodymium, cerium, neodymium, samarium, and combinations thereof. In preferred embodiments, the rare earth aluminate comprises a hexaaluminate-like structure or a beta-alumina-like structure, which comprises an Al:Ln between 11:1 and 14:1.

The present invention further relates to a thermally stable aluminum-based catalyst support, wherein the thermally stable aluminum-based catalyst support comprises an aluminum oxide phase selected from the group consisting of alpha-alumina, theta-alumina, or combinations thereof; and a rare earth aluminate comprising a rare earth metal, wherein the alumina-like rare earth aluminate has a molar ratio of aluminum to rare earth metal greater than 5:1. The rare earth aluminate with a high molar ratio of aluminum to rare earth metal comprises from 100 wt % of the support and more preferably less than 100 wt % down to as little as 1 wt % of the material weight in the catalyst support. In preferred embodiments, the thermally stable support comprises between about 1 wt % and about 50 wt % of said rare earth aluminate. In other embodiments, the thermally stable aluminum-based catalyst support could comprise between 40 wt % and 100 wt % of rare earth aluminate; and in some cases, the support is a rare earth aluminate or a mixture of rare earth aluminates with a molar ratio of aluminum to rare earth metal greater than 5:1. The thermally stable catalyst support could contain between about 1 wt % and about 20 wt % of rare earth metal; preferably between about 1 wt % and about 10 wt % of rare earth metal. The rare earth aluminate preferably comprises lanthanum, praseodymium, cerium, neodymium, samarium, or combinations thereof. In preferred embodiments, the rare earth aluminate comprises a hexaaluminate-like structure, a beta-alumina like structure, or combinations thereof. In these preferred embodiments, the thermally stable catalyst support comprises at least one rare earth aluminate with an aluminum-to-rare earth molar ratio between 11:1 and 14:1; and at least one aluminum oxide phase selected from alpha-alumina, theta-alumina, or combinations thereof. The thermally stable aluminum-based material may further comprise a transition alumina, such as delta-alumina, eta-alumina, kappa-alumina, chi-alumina, rho-alumina, kappa-alumina, or any combinations thereof, but is preferably substantially free of gamma-alumina.

The method for making a high surface area aluminum-based support includes applying at least one stabilizing agent to an aluminum-containing precursor following by heat treatment, wherein the heat treatment conditions are selected such that a portion of the aluminum-containing precursor is transformed to a transition alumina and optionally to alpha-alumina, wherein the transition alumina comprises delta-alumina, eta-alumina, kappa-alumina, chi-alumina, rho-alumina, kappa-alumina, or any combinations thereof. The heat treatment can be also effective in transforming another portion of the aluminum-containing precursor to an aluminate comprising at least a portion of said stabilizing agent, and wherein the resulting support is preferably substantially free of gamma-alumina. The stabilizing agent preferably comprises a rare earth metal. The stabilizing agent preferably includes a lanthanide metal selected from the group consisting of lanthanum, cerium, neodymium, praseodymium, and samarium, but may further include any element from Groups 1-14 of the Periodic Table (new IUPAC notation) such as an alkali metal, an alkali earth metal, a second rare earth metal, or a transition metal. The aluminum-containing precursor comprises at least one material selected from the group consisting of an oxide of aluminum, a salt of aluminum, an alkoxide of aluminum, a hydroxide of aluminum, and combinations thereof.

The present invention also includes a method for making a thermally stable aluminum-based catalyst support suitable for use in a high temperature reaction. This method includes applying at least one rare earth metal compound to an aluminum-containing precursor; and treating by heat the applied precursor, wherein the heat treatment conditions are selected such that at least a portion of the aluminum-containing precursor is transformed to an aluminate comprising at least a portion of said rare earth metal, and wherein the rare earth aluminate comprises an aluminum-to-rare earth metal molar ratio greater than 5:1. The heat treatment is performed in a manner effective to obtain about 1 wt % and 100 wt % of said rare earth aluminate in the thermally stable catalyst support. In preferred embodiments, the heat treatment is performed in a manner effective to obtain between about 1 wt % and about 50 wt % of said rare earth aluminate in the thermally stable support. In other embodiments, the heat treatment is performed in a manner effective to obtain between 40 wt % and 100 wt % of rare earth aluminate in the thermally stable catalyst support. In some alternate embodiment, the heat treatment is performed in a manner effective to transform all of the aluminum-containing precursor to at least one rare earth aluminate with an aluminum-to-rare earth metal molar ratio greater than 5:1. The application and heating steps preferably employ an impregnation technique and calcination in an oxidizing atmosphere, respectively. Additionally, the heat treatment step is effective to transform another portion of said aluminum-containing precursor to an aluminum oxide phase comprising alpha-alumina, a transition alumina, or combinations thereof, wherein the transition alumina comprises delta-alumina, eta-alumina, kappa-alumina, chi-alumina, rho-alumina, kappa-alumina, theta-alumina, or any combinations thereof. The transition alumina comprises preferably theta-alumina.

The invention further includes a catalyst comprising a catalytically active metal selected from the group consisting of rhodium (Rh), ruthenium (Ru), iridium (Ir), platinum (Pt), palladium (Pd), and rhenium (Re), on a thermally stabilized support wherein the thermally stabilized support comprises theta-alumina, a rare earth aluminate with an aluminum to rare earth metal molar ratio greater than 5:1, or combinations thereof.

More particularly, the invention includes a catalyst comprising a catalytically active metal selected from the group consisting of rhodium (Rh), ruthenium (Ru), iridium (Ir), platinum (Pt), palladium (Pd), and rhenium (Re), on a thermally stabilized support wherein the thermally stabilized support comprises between about 1 wt % and 100 wt % of a rare earth aluminate with an aluminum to rare earth metal molar ratio greater than 5:1.

A more specific embodiment of the invention relates to a partial oxidation catalyst with an active ingredient selected from the group consisting of rhodium, iridium, and ruthenium; and an optional promoter loaded onto a thermally stable support, wherein said support includes an alumina phase selected from the group consisting of alpha-alumina, theta-alumina, or any combinations thereof; and between about 1 wt % and about 50 wt % of a rare earth aluminate with a molar ratio of aluminum to said rare earth metal greater than 5:1. In other embodiments, the thermally stable aluminum-based catalyst support could comprise more than 40 wt % of rare earth aluminate and less than 100 wt % of rare earth aluminate.

The present invention can be more specifically seen as a support, process and catalyst for a partial oxidation reaction, wherein the support comprises a rare earth aluminate having a molar ratio of aluminum to rare earth metal greater than 5:1, and wherein the rare earth aluminate preferably comprises an element selected from the group consisting of lanthanum, cerium, praseodymium, samarium, and neodymium. The support may comprise between 1 wt % to 100 wt % of the rare earth aluminate. In preferred embodiments, the thermally stable support comprises between about 1 wt % and about 50 wt % of said rare earth aluminate. In other embodiments, the thermally stable aluminum-based catalyst support could comprise between 40 wt % and 100 wt % of the rare earth aluminate; and in some alternate embodiments, the support is a rare earth aluminate or a mixture of rare earth aluminates with an aluminum to rare earth metal molar ratio greater than 5:1. The supported catalyst comprises at least one catalytically active metal selected from the group consisting of rhodium, ruthenium, iridium, platinum, palladium, and rhenium, preferably selected from the group consisting of rhodium, iridium, and ruthenium, and optionally the catalyst can also comprise a promoter.

More particularly, the invention relates to processes for the catalytic partial oxidation of light hydrocarbons (e.g., methane or natural gas) to produce primarily synthesis gas and the use of such supported catalysts to make carbon monoxide and hydrogen under conditions of high gas hourly space velocity, elevated pressure and high temperature.

The process for making synthesis gas comprises converting a gaseous hydrocarbon stream and an oxygen-containing stream over a partial oxidation catalyst, to make a product stream comprising CO and $H_2$, wherein said partial oxidation catalyst includes an active ingredient comprising rhodium, iridium, platinum, palladium, ruthenium, or combinations thereof; and a support comprising a rare earth aluminate, said rare earth aluminate having a molar ratio of aluminum to rare earth metal greater than 5:1. The support could comprise between about 1 wt % and 100 wt % of said rare earth aluminate, preferably between about 1 wt % and about 50 wt % of said rare earth aluminate. In other embodiments, the support could comprise between 40 wt % and 100 wt % of the rare earth aluminate; and in some alternate embodiments, the support is a rare earth aluminate or a mixture of rare earth aluminates with an molar ratio of aluminum to rare earth metal greater than 5:1. The rare earth metal is selected from the group consisting of lanthanum, neodymium, praseodymium, cerium, and combinations thereof, and the support could comprise between about 1 wt % and about 20 wt % of the rare earth metal, but preferably between about 1 wt % and about 10 wt % of the rare earth metal. The support may further comprise an aluminum oxide such as alpha-alumina, a transition alumina, or combinations thereof, wherein the transition alumina comprises delta-alumina, eta-alumina, kappa-alumina, chi-alumina, rho-alumina, kappa-alumina, theta-alumina, or any combinations thereof. The transition alumina comprises preferably theta-alumina. The support may further comprise an oxide of said rare earth metal and/or an aluminate of said rare earth aluminate with a low aluminum to rare earth metal molar ratio, such as below 2:1.

The present invention further relates to catalysts and processes for the conversion of gaseous light hydrocarbons for producing a hydrocarbon product, comprising primarily hydrocarbons with 5 carbons atoms or more ($C_{5+}$).

BRIEF DESCRIPTION OF THE DRAWINGS

For a more detailed understanding of the preferred embodiments, reference is made to the accompanying drawings, wherein:

FIGS. 3a and 3b represent the effect of lanthanum loadings on the resulting surface area and pore volume (respectively) of catalyst supports made at two different calcinations temperatures; and FIG. 4 represents the performance data for synthesis gas production from a catalyst made according to a preferred embodiment of the invention.

DETAILED DESCRIPTION OF PREFERRED EMBODIMENTS

Figure 1:
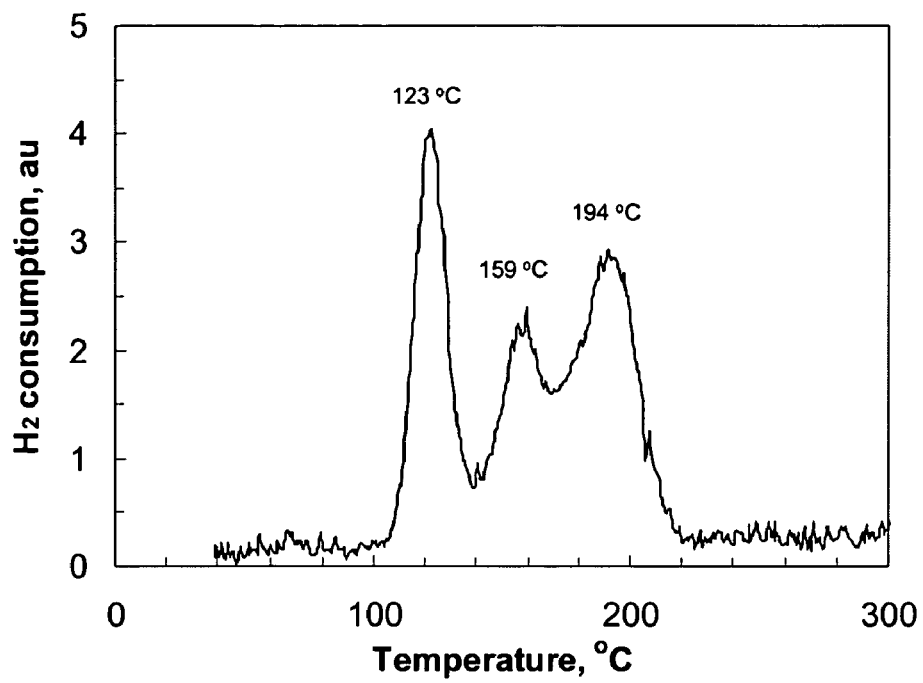
FIG. 1 represents the temperature programmed reduction (TPR) profile of a catalyst comprising mainly theta-alumina according to this invention.

The present invention is based on the surprising discovery that a supported rhodium-based catalyst supported on an aluminum-based matrix modified with a lanthanum compound showed excellent performance with conversion and selectivities above 90%, and a sustainable activity over more than 300 hours on line while in contact with natural gas and molecular oxygen under suitable conditions for catalytic partial oxidation, namely at high temperatures and at high pressure. It was found that this catalyst initially comprised about 65% theta-alumina phase, some small amount of alpha-alumina (10%), but was free of gamma-alumina. In addition the catalyst comprised a good portion of lanthanum aluminum mixed oxide compounds (La—Al—O) with a hexaaluminate-like structure (18%). This hexaaluminate-like structure comprised the majority of the lanthanum. Moreover this catalyst showed a low reduction peak temperature in a TPR analysis (shown in FIG. 1), much lower than similar catalysts which comprised supports with less theta-alumina phase, more gamma-alumina, minimal amount of rare earth aluminates, and substantially almost no alpha-alumina, or for similar catalysts which comprised supports of mainly alpha-alumina.

As described in Weng et al. (The Chemical Record, 2002, vol. 2, pp. 101-113), it is believed that a low TPR peak temperature is an indication of a loose Rh—O bond, thereby favoring the formation of reduced rhodium on the surface of the catalyst, which in turn favors the direct mechanism of partial oxidation (Scheme 2). The direct mechanism generates a lot less heat (the heat of $CH_4 + \frac{1}{2}O_2$ reaction is −6.6 kcal/mol) whereas the combustion reaction in Scheme 1 generates much more heat (as the heat of $CH_4 + 2O_2$ is −191.3 kcal/mol). Therefore the direct mechanism should produce a cooler catalyst surface temperature. Without wishing to be bound to this theory, the Applicant believes that the presence of a theta-alumina phase might increase oxygen mobility, increases the fraction of rhodium in reduced state, increases the conversion of methane (and other light hydrocarbons) via the direct mechanism and thereby reduces the catalyst surface temperature. It is expected that a cooler catalyst surface temperature prevents or minimizes the formation of carbonaceous deposit on the catalyst surface, which is one of the source of catalyst deactivation. Another source of catalyst deactivation is the phase transformation of alumina to ultimately alpha-alumina and concurring support disintegration, surface cracking and/or loss of surface area. Therefore a cooler catalyst surface temperature should also slow the rate the phase transformation of alumina, which is thermodynamically favored by increase in temperature.

Modifying alumina ($Al_2O_3$) with some rare earth metals has been proven to be effective in stabilizing the surface area of modified $Al_2O_3$. Doping a gamma-alumina ($\gamma$-$Al_2O_3$) with certain metal oxides such as for example lanthanum oxide ($La_2O_3$) inhibits or retards the phase transformation of gamma-alumina phase to theta-alumina ($\theta$-$Al_2O_3$) phase and eventually to alpha-alumina ($\alpha$-$Al_2O_3$) phase and thus stabilizes the surface area and pore structure of the alumina material even at high calcination temperatures above 1,000° C. Not only doping the surface of gamma-alumina ($\gamma$-$Al_2O_3$) can stabilize the surface structure of aluminum oxide ($Al_2O_3$) and thus delay the phase transformation to alpha alumina, but also it can slow down the sintering at high temperatures. The driving force for sintering is the minimization of surface free energy, and thus thermodynamically, sintering is an irreversible process in which a free energy decrease is brought about by a decrease in surface area. Sintering is usually initiated on the particle surface at elevated temperature, in a range where surface atoms become mobile and where diffusional mass transport is appreciable. The formation of Ln-Al—O mixed oxide compounds could inhibit the surface diffusion of species responsible for sintering, and thereby may be one of the key stabilization factors on an alumina surface at high temperatures.

The formation of highly thermal stable La—Al—O mixed oxide compounds such as those of hexaaluminate-type structure should also ultimately help maintain a relatively high surface area. However, it is not clear from the literature that the formation of lanthanum aluminates with hexaaluminate-like or beta-alumina structures from an alumina precursor modified with lanthanum would explain an improved thermal stability of this catalyst. Beguin et al (1991) in fact disclosed that the formation of lanthanum beta-alumina structures was associated with the loss of the stabilizing effect of lanthanum on an alumina-based material; and therefore showed that the formation of lanthanum beta-alumina structures was detrimental to the stabilization effect associated with the modification of alumina by lanthanum. Oudet et al (Applied Catalysis, 1991, vol. 75, pp. 119-132) attributed the stabilization of alumina by lanthanum to the nucleation of a cubic lanthanum aluminum oxide structure ($LaAlO_3$) on the surface of the alumina support, which inhibits the surface diffusion of species responsible for sintering.

As for the method of preparation, Schaper et al. (Applied Catalysis, 1983, vol. 7, pp.211-220) who studied the influence of addition of lanthanum (0-5 mol % $La_2O_3$) on the thermal stability of gamma-alumina between 800 and 1,100° C., did not observed the formation of lanthanum hexaaluminate even though they observed a retardation in the sintering of gamma-alumina by the presence of perovskite-type lanthanum aluminate ($LaAlO_3$). The discrepancy between the formation of lanthanum hexaaluminate structures in Kato et al. (1987) and the absence of lanthanum hexaaluminate structures in Schaper et al (1983) is most likely attributed to the differences of the preparation method. Kato et al. mentioned that, with the impregnation technique, the higher concentration of lanthanum at the surface layer of the alumina phase probably tends to favor the formation of a lanthanum aluminate with a low aluminum-to-lanthanum ratio. However, according to this invention, lanthanum aluminates with a high aluminum-to-lanthanum ratio were being formed using an impregnation technique. It was quite unexpected, first to find that lanthanum hexaaluminate-like structures were formed in a catalyst support made by an impregnation technique on a lanthanum precursor on a gamma-alumina, and that, second, the presence of lanthanum hexaaluminate-like structures in a catalyst support did result in a more stable performance of the catalyst made therefrom. Therefore, this invention relates to a catalyst support, which comprises a rare earth aluminate with a high aluminum-to-rare earth molar ratio, and to catalysts made therefrom used in high temperature environments which show unexpected good thermal stability and have a greater surface area than those catalysts supported on alpha-alumina under similar operating conditions.

Herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the specifically expressed methods or compositions or applications contained herein. In particular, various embodiments of the present invention provide a number of different combinations of features to generate high surface area supports for high temperature applications, which also comprise very good thermal stability.

Supports

The thermally stable supports according to this invention can have different forms such as monolith or particulate or have discrete or distinct structures. The term "monolith" as used herein is any singular piece of material of continuous manufacture such as solid pieces of metal or metal oxide or foam materials or honeycomb structures. The terms "distinct" or "discrete" structures or units, as used herein, refer to supports in the form of divided materials such as granules, beads, pills, pastilles, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than six millimeters, preferably less than three millimeters. The support is preferably in discrete structures, and particulates are more preferred.

Thermally Stable Catalyst Support Comprising a Rare Earth Aluminate with Al:Ln>5:1

This invention relates to a thermally stable aluminum-based support comprising a rare earth aluminate with a high aluminum-to-rare earth molar ratio. The aluminum-to-rare earth molar ratio (Al:Ln) is greater than 5:1; preferably greater than about 10; and more preferably between about 11:1 and about 14:1. Preferably the thermally stable aluminum-based contains at least one rare earth aluminate selected from a rare earth hexaaluminate-like structure and/or a rare earth beta-alumina-like structure.

The thermally stable aluminum-based support may comprise between 1 wt % to 100 wt % of the rare earth aluminate with a high Al:Ln ratio. In preferred embodiments, the thermally stable support comprises between about 1 wt % and about 50 wt % of said rare earth aluminate; more preferably between about 5 wt % and about 45 wt % of the rare earth aluminate; and still more preferably between about 10 wt % and about 40 wt % of the rare earth aluminate. In other embodiments, the thermally stable aluminum-based catalyst support could comprise between 40 wt % and 100 wt % of the rare earth aluminate; and in some alternate embodiments, one or more rare earth aluminates with high aluminum-to-rare earth molar ratios (greater than 5:1) comprises 100 wt % of the support. The support in the catalyst could comprise between about 1 wt % and 100 wt % of said rare earth aluminate. In preferred embodiments, the support in the catalyst comprises between about 1 wt % and about 50 wt % of said rare earth aluminate. In other embodiments, the support in the catalyst could comprise more than 40 wt % of rare earth aluminate, i.e., between 40 wt % and 100 wt % of rare earth aluminate; and in some cases, the support is a rare earth aluminate or a mixture of rare earth aluminates with a molar ratio of aluminum to rare earth metal greater than 5:1. It should be readily appreciated that there are preferences within the 1 wt %-100 wt % range for the rare earth aluminate content of the support depending on the desired properties of the support.

The support should contain between about 1 wt % and about 20 wt % of rare earth metal; preferably between about 1 wt % and about 10 wt % of rare earth metal. The rare earth aluminate preferably comprises a hexaaluminate-like structure, a beta-aluminate-like structure, or combinations thereof, such as a lanthanum hexaaluminate or a lanthanum beta-alumina. The rare earth aluminate comprises a rare earth metal selected from the group consisting of lanthanum, neodymium, praseodymium, and combinations thereof. In preferred embodiments, the rare earth aluminate comprises preferably La, and optionally Sm.

It is envisioned that the rare earth aluminate with a high Al:Ln molar ratio could comprise different species of aluminates with varying Al:Ln molar ratios, as long as the different ratios are all greater than 5:1; or that the rare earth aluminate could comprise combinations of different rare earth aluminates of similar structure but comprising different rare earth metals. It should be appreciated that the rare earth aluminate could comprise any combinations of these features. For example, the support could comprise one rare earth aluminate with a Al:Ln ratio of 11:1 and an aluminate of the same rare earth metal with a higher Al:Ln ratio of 12:1. In another example, the support could comprise aluminates of two or more rare earth metals all with an Al:Ln ratio of 11:1.

The thermally stable aluminum-based support could comprise between about 1 wt % and about 20 wt % of the rare earth metal; but preferably between about 1 wt % and about 10 wt %; more preferably between about 2 wt % and about 8 wt %; and still more preferably between about 4 wt % and about 8 wt %.

This rare earth metal content corresponds to rare earth oxide loading between about 1.2 wt % and about 23 wt % of the rare earth oxide; preferably between about 1.2 wt % and about 12 wt %; more preferably between about 2.4 wt % and about 9.4 wt %; and still more preferably between about 4.7 wt % and about 9.4 wt %. This rare earth metal weight content also corresponds to rare earth oxide molar content between about 0.3 mol % and about 7 mol % of the rare earth oxide; preferably between about 0.3 mol % and about 3.5 mol % of the rare earth oxide; more preferably between about 0.6 mol % and about 2.6 mol %; and still more preferably between about 1.2 mol % and about 2.6 mol %. The rare earth oxide molar content is calculated as the ratio of the number of moles of rare earth oxide over the total number of moles of rare earth oxide and aluminum oxide.

The selection of the rare earth loading on the support is dependent on the desirable range of the surface area of the support. There seems to be an optimum range of loadings for which the surface area is maximized as illustrated in FIGS. 3a and 3b. Beyond that range, thermal stability can still be achieved, but the support would have a lower surface area.

The thermally stable aluminum-based support may also comprise an oxide of a rare earth metal. For example, the rare earth aluminate with a high Al:Ln ratio might comprise only a fraction of the loaded (or applied) rare earth metal, and the other fraction of the loaded rare earth metal may form a rare earth metal oxide.

The thermally stable aluminum-based support may also comprise other rare earth aluminate structures with a low aluminum-to-rare earth metal molar ratio lower than 5:1, such as perovskite structures, monoclinic structures, or garnet structures with typically Al:Ln ratios less than 2:1.

According to another embodiment of this invention, the thermally stable catalyst support further comprises an alumina phase selected from the group consisting of alpha-alumina, theta-alumina or any combinations thereof. The rare earth aluminate with a high Al:Ln molar ratio and the alumina phase could be intimately mixed, or the rare earth aluminate could coat the alumina phase partially or completely. A surface layer comprising said rare earth aluminate with a high Al:Ln molar ratio preferably covers either partially or completely the alumina phase surface; with a complete coverage being more preferred. Therefore a person skilled in the art could select a method of preparation to achieve a well-mixed rare earth aluminate and alumina combination, such as via a sol-gel method or a co-precipitation method, or to achieve a coating of rare earth aluminate over the alumina surface, such as via impregnation or chemical vapor deposition. For the later techniques, which result in a coating of rare earth aluminate over the alumina surface, the rare earth loading should be selected such that a desired coating is achieved. For example, one can estimate the necessary amount of rare earth aluminate to completely cover the surface of the support precursor by one monolayer of said rare earth aluminate.

In preferred embodiments, the thermally stable catalyst support comprises a rare earth hexaaluminate structure, a rare earth beta-alumina structure, or combinations thereof.

The rare earth aluminate could comprise a chemical formula of $LnAl_yO_z$, wherein Al and O represent aluminum atoms and oxygen atoms respectively; Ln comprises lanthanum, neodymium, praseodymium, cerium, or combinations thereof; y is between 11 and 14; and z is between 18 and 23.

The rare earth aluminate could comprise a chemical formula of $(Ln_2O_3).y(Al_2O_3)$, where Ln comprises one rare earth metal chosen from lanthanum, neodymium, praseodymium, cerium, or combinations thereof; and y is between 11 and 14.

In addition to comprising a rare earth metal, the rare earth aluminate may further comprise an element from Groups 1-17 of the Periodic Table; particularly preferred, the rare earth aluminate may further comprise nickel, magnesium, barium, potassium, sodium, manganese, a second rare earth metal (such as samarium), or any combinations thereof.

The rare earth aluminate preferably could comprise a chemical formula characterized by $MAl_yO_z$ wherein Al and O represent aluminum atoms and oxygen atoms respectively; y=11-14; z=18-23; and wherein M preferably comprises at least one rare earth metal selected from lanthanum (La), cerium (Ce), praseodymium (Pr), neodymium (Nd), or combinations thereof. M could also comprise two or more elements from Groups 1-17 of the Periodic Table, with at least one of them being a rare earth metal. The other element is selected from Groups 1-14, and preferably comprises nickel, magnesium, barium, potassium, sodium, manganese, a second rare earth metal (such as samarium), or any combinations thereof. In preferred embodiments, M comprises preferably La, and optionally Sm. In some embodiments, M comprises both La and Sm.

In more preferred embodiments, the rare earth aluminate comprises a lanthanum hexaaluminate. The lanthanum hexaaluminates have a chemical formula of $(La_2O_3).y(Al_2O_3)$, where La represents lanthanum, and y is between 11 and 14.

The thermally stable support may further comprise an oxide of said rare earth metal, said rare earth oxide consisting essentially of rare earth metal atoms and oxygen atoms. The oxide of said rare earth metal (Ln) preferably has a chemical formula of $Ln_2O_3$. It should be appreciated that in some cases, the combination of both rare earth aluminates and rare earth oxides in the catalyst support might be desirable to improve support stability.

In addition, according to one embodiment, there is an expectation that a less acidic surface layer may encourage the formation of more uniform crystallites of a catalytically active metal resulting in smaller metal crystallite sizes. The catalysts made from these thermally stable catalyst supports of the present invention are expected to have excellent stability, high activity and extended catalyst lifetimes, while maintaining desirable selectivity, pore structure and particle size.

This rare earth modified support with enhanced thermal stability which comprises a rare earth aluminate with a high Al:Ln molar ratio, has an initial minimum BET surface area of 2 $m^2/g$, preferably greater than 5 $m^2/g$, more preferably greater than about 7 $m^2/g$, but no more than 30 $m^2/g$.

High Surface Area Catalyst Support Comprising at Least Theta-Alumina

In another embodiment, a high surface area catalyst support is obtained by heat treatment of an alumina precursor with a stabilizing agent. The high surface area alumina support comprises a transition alumina comprising at least one alumina polymorph between gamma-alumina and alpha-alumina, but excluding gamma-alumina and alpha-alumina. The transition alumina preferably comprises theta-alumina and is preferably substantially free of gamma-alumina. The high surface area alumina support may further comprise alpha-alumina and/or an aluminate of said stabilizing agent. The stabilizing agent comprises at least one element selected from the group consisting of boron, silicon, gallium, selenium, rare earth metals, transition metals, and alkali earth metals, preferably selected from the group consisting of boron (B), silicon (Si), gallium (Ga), selenium (Se), calcium (Ca), zirconium (Zr), iron, (Fe), cobalt (Co), manganese (Mn), magnesium (Mg), and the rare earth elements, i.e., scandium (Sc), ytrium (Y), lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), and lutetium (Lu). More preferably the stabilizing agent comprises La, Sm, Nd, Pr, Ce, Eu, Yb, Si, Ce, Mg, Ca, Mn, Co, Fe, Zr, or any combinations thereof. Most preferably, the stabilizing agent comprises La, Sm, Nd, Pr, Ce, Eu, Yb, Si, Mg, Co, or any combinations thereof. In addition, promoters may be applied to the stabilized support. Such deposited promoters may also maintain an improved dispersion on active species during catalyst preparation.

According to one embodiment of the present invention, a high surface area alumina comprising mostly theta-alumina, which is modified with a rare earth metal and/or a rare earth metal oxide, serves as an improved support for synthesis gas production catalysts used in reactors operating at high-pressure and high-temperature. The catalyst support thus obtained tends to be more resistant to phase deterioration under highly thermal conditions than gamma-alumina, and yet provide greater surface area than alpha-alumina. This thermally stable catalyst support is porous and is suitable for use in high temperature environments. This surface area is typically higher that alpha-alumina, and its thermal stability greater than gamma-alumina. It has a surface area greater than 2 meter square per gram ($m^2/g$), preferably between about 5 $m^2/g$ and 100 $m^2/g$, more preferably between about 20 $m^2/g$ and 80 $m^2/g$.

One stabilized alumina support according to one embodiment of this invention preferably comprises, when fresh, at least 50% theta-alumina phase, preferably between about 60% and 75% theta-alumina; not more than about 20% alpha-alumina, and is preferably substantially free of gamma-alumina, i.e., less than about 5% gamma-alumina. In addition the support may comprise between about 1 wt % and about 50 wt % of a rare earth aluminate with a molar ratio of aluminum to rare earth metal greater than 5:1.

Catalysts

The present invention pertains to catalysts comprising one catalytically active metal on high surface area alumina supports or thermally stabilized aluminum-based supports, wherein the catalysts are active for the conversion of light hydrocarbons to synthesis gas. In particular, the current invention addresses the stability and durability of catalyst supports and catalysts made therefrom for use in catalytic partial oxidation reactors operating at high temperatures and pressures.

Catalysts Based on High Surface Area Supports Comprising at Least Theta-Alumina

According to one embodiment of the present invention, an alumina support comprising mostly theta-alumina, which is modified with one rare earth oxide, serves as an improved support for synthesis gas production catalysts used in reactors operating at high-pressure and high-temperature. The catalyst support thus obtained tends to be more resistant to phase deterioration under highly thermal conditions than gamma-alumina. The presence of mostly theta-alumina may result in a weaker R—O bond, where R is the catalytically active metal. The weaker R—O bond should lead to easier removal of the surface oxygen, and therefore a lower TPR temperature peak. During normal operating conditions, a weaker R—O bond would promote reduced active metal on the surface, which would favor a direct oxidation pathway (Scheme 2). In turn, this would lead to lower catalyst surface temperatures, which will slow the phase transformation of alumina to alpha-alumina (also slows deactivation).

Moreover, interactions between catalytically active metal and the alumina support are affected by the presence of the rare earth oxide. Without wishing to be bound to a particular theory, it is believed that the active metal-support interaction in catalysts supported on rare earth modified alumina, for example $La_2O_3$-modified $Al_2O_3$ is stronger than that in the similar catalysts supported on unmodified $Al_2O_3$, and that this strong metal-support interaction in $La_2O_3$-modified $Al_2O_3$ supported catalysts might be another reason for the unusually high catalyst stability.

The present invention also relates to improved catalyst compositions using a stabilized alumina support, as well as methods of making and using them, wherein the stabilized comprises a transition alumina phase (excluding gamma-alumina) between the low-temperature transition gamma-alumina and the high-temperature stable alpha-alumina, wherein the transition alumina is preferably theta-alumina, but could comprise low amounts of other transition alumina phases. In addition the stabilized alumina may comprise rare earth aluminates. The catalyst is supported on a stabilized alumina with an initial minimum BET surface area of 2 $m^2/g$, preferably greater than 5 $m^2/g$, more preferably greater than 10 $m^2/g$, but no more than 30 $m^2/g$, after high temperature treatment or calcination. Preferably the stabilized alumina is modified with compounds of lanthanide metals, such as for example, compounds of lanthanum, samarium, praseodymium, cerium, or neodymium. Without wishing to be bound to a particular theory, it is believed that the metal-support interaction in catalysts supported on for example $La_2O_3$-modified $Al_2O_3$ is stronger than that in the catalyst supported on unmodified $Al_2O_3$, and that this strong metal-support interaction in $La_2O_3$-modified $Al_2O_3$ supported catalysts might be responsible for the unusually high catalyst stability.

Catalysts Based on Supports Comprising a Rare Earth Aluminate with a Al:Ln>5:1

According to another embodiment of the present invention, an alumina-containing support comprising a rare earth aluminate with an aluminum-to-rare earth metal molar ratio greater than 5:1, serves as an improved support for synthesis gas production catalysts used in reactors operating at high-pressure and high-temperature. The catalyst support thus obtained tends to be more resistant to phase deterioration under highly thermal conditions than gamma-alumina, and offers greater surface area than alpha-alumina. In addition to the presence of an alumina phase (either theta-alumina, alpha-alumina, or both), the presence of rare earth hexaaluminate structures is an indication that a distinct ordered aluminum structure comprising at least one rare earth metal is being formed during the preparation of the catalyst support. The formation of hexaaluminates comprising a rare earth metal during the preparation of the support described herein is believed to be another potential source of stabilization of the support, as the presence of rare earth aluminates most likely also affect the active metal-support interactions.

Catalysts Based on High Surface Area Thermally Stable Supports

This invention also relates to a partial oxidation catalyst comprising an active ingredient selected from the group consisting of rhodium, iridium, platinum, palladium, and ruthenium; an optional promoter; and a support comprising a rare earth aluminate with a molar ratio of aluminum to rare earth metal greater than 5:1. The support in the catalyst could comprise between about 1 wt % and 100 wt % of said rare earth aluminate. In preferred embodiments, the support in the catalyst comprises between about 1 wt % and about 50 wt % of said rare earth aluminate. In other embodiments, the support in the catalyst could comprise more than 50 wt % of rare earth aluminate, i.e., between 40 wt % and 100 wt % of rare earth aluminate; and in some cases, the support is a rare earth aluminate or a mixture of rare earth aluminates with a molar ratio of aluminum to rare earth metal greater than 5:1, such as a lanthanum hexaaluminate or a lanthanum beta-alumina. The support should contain between about 1 wt % and about 20 wt % of rare earth metal; preferably between about 1 wt % and about 10 wt % of rare earth metal. The rare earth aluminate preferably comprises a hexaaluminate structure, a beta-aluminate structure, or combinations thereof. The rare earth aluminate comprises a rare earth metal selected from the group consisting of lanthanum, neodymium, praseodymium, and combinations thereof. In preferred embodiments, the rare earth aluminate comprises preferably La, and optionally Sm.

A particularly preferred embodiment discloses a partial oxidation catalyst comprising an active ingredient selected from the group consisting of rhodium, iridium, platinum, palladium, and ruthenium; an optional promoter; and a support comprising an alumina phase selected from the group consisting of alpha-alumina, theta-alumina, or any combinations thereof; and a rare earth aluminate with a molar ratio of aluminum to rare earth metal greater than 5:1, and wherein the support comprises between about 1 wt % and about 50 wt % of said rare earth aluminate. The rare earth aluminate preferably comprises a hexaaluminate-like structure, a beta-aluminate-like structure, or any combinations thereof. The rare earth aluminate comprises a rare earth metal selected from the group consisting of lanthanum, neodymium, cerium, praseodymium, and combinations thereof. In preferred embodiments, the rare earth aluminate comprises preferably La, and optionally Sm.

Another embodiment discloses a partial oxidation catalyst comprising an active ingredient selected from the group consisting of rhodium, iridium, and ruthenium; an optional promoter; and a rare earth aluminate, wherein the rare earth aluminate comprises an Al:Ln molar ratio between 11:1 and 14:1. The rare earth aluminate preferably has a hexaaluminate like structure, a beta-aluminate like structure, or combinations thereof. The rare earth aluminate preferably comprises a rare earth metal selected from the group consisting of lanthanum, neodymium, cerium, praseodymium, and combinations thereof. In preferred embodiments, the rare earth aluminate comprises preferably La, and optionally Sm. The active ingredient and the optional promoter are preferably supported on said rare earth aluminate with a high Al:Ln molar ratio.

All catalysts according to this invention can be used for producing synthesis gas, and therefore should comprise an active metal selected from the group consisting of metals from Groups 8, 9, or 10 of the Periodic Table, rhenium, tungsten, molybdenum, and any mixtures thereof. Preferably the catalyst used for producing synthesis gas comprises rhodium, ruthenium, iridium, platinum, palladium, rhenium, or any combinations thereof. More preferably the catalyst used for producing synthesis gas comprises rhodium, ruthenium, iridium, or any combinations thereof.

In some embodiments, the active metal may be comprised in an alloy form, preferably a rhodium alloy. Although not wishing the scope of this application to be limited to this particular theory, the Applicants believe that alloying rhodium with other metals appears to sustain the resistance of rhodium catalysts to sintering, and therefore to allow the Rh alloy catalysts to deactivate at a slower rate than syngas catalysts containing only rhodium. Suitable metals for the rhodium alloy generally include but are not limited to metals from Groups 8, 9, or 10 of the Periodic Table, as well as rhenium, tantalum, niobium, molybdenum, tungsten, zirconium and mixtures thereof. The preferred metals for alloying with rhodium are ruthenium, iridium, platinum, palladium, tantalum, niobium, molybdenum, rhenium, tungsten, cobalt, and zirconium, more preferably ruthenium, rhenium, and iridium. In accordance with the present invention, the loading of the active metal in the catalyst is preferably between 0.1 and 50 weight percent of the total catalyst weight (herein wt %).

In a preferred embodiment of the invention, the catalyst comprises rhodium as the active metal. The rhodium content in the catalyst is between about 0.1 wt % to about 20 wt %, preferably from about 0.5 wt % to about 10 wt %, and more preferably from about 0.5 wt % to about 6 wt %. When a rhodium alloy is used, the other metal in the rhodium alloy preferably comprises from about 0.1 wt % to about 20 wt % of the catalyst, preferably from about 0.5 wt % to about 10 wt %, and more preferably from about 0.5 wt % to about 5 wt %. The other metal in the rhodium alloy could be iridium, ruthenium, or rhenium.

In another embodiment of the invention, the catalyst comprises ruthenium as the active metal. The ruthenium content in the catalyst is between about 0.1 to 15 wt %, preferably from about 1 to about 8 wt %, and more preferably from about 2 to about 5 wt %.

The catalyst structure employed is characterized by having a metal surface area of at least 0.5 square meters of metal per gram of catalyst structure, preferably at least 0.8 $m^2/g$. Preferably the metal is rhodium and the rhodium surface area at least 0.5 square meters of rhodium per gram of supported catalyst, preferably at least 0.8 $m^2/g$.

Catalyst compositions may also contain one or more promoters. In some embodiments when one active metal is rhodium, rhenium, ruthenium, palladium, platinum, or iridium, the promoter comprises an element selected from the group consisting of La, Ce, Pr, Nd, Pm, Sm, Eu, Gd, Tb, Dy, Ho, Er, Tm, Yb and Lu, preferably Sm, Eu, Pr and Yb. The introduction of a lanthanide oxide, especially $Sm_2O_3$, on the stabilized alumina support surface before deposition of active metal is believed to further enhance the metal-support interaction, and that the active metal also disperses better on the surface of $Al_2O_3$ modified with $La_2O_3$ and/or $Sm_2O_3$. According to some embodiments with the use of a rhodium alloy, the presence of a promoter metal can be omitted without detriment to the catalyst activity and/or selectivity. It is foreseeable however that, in some alternate embodiments, a promoter could be added to a catalyst material comprising a rhodium alloy.

In one embodiment of the present invention is more preferably directed towards syngas catalysts used in partial oxidation reactions and even more preferably used in syngas catalysts that contain solely rhodium or rhodium alloys. However, it should be appreciated that the catalyst compositions according to the present invention are useful for other partial oxidation reactions, which are intended to be within the scope of the present invention.

A preferred embodiment of this invention relates to a partial oxidation catalyst composition. The partial oxidation catalyst comprises an active ingredient selected from the group consisting of rhodium, iridium, platinum, palladium, and ruthenium; an optional promoter; and a support comprising an alumina phase selected from the group consisting of alpha-alumina, theta-alumina or any combinations thereof; and a rare earth aluminate comprising a rare earth metal, wherein the rare earth aluminate has a molar ratio of aluminum to rare earth metal greater than 5:1, and wherein the support comprises between about 1 wt % and about 50 wt % of said rare earth aluminate. The optional promoter comprises an element selected from the group consisting of La, Ce, Pr, Nd, Pm, Sm, Eu, Gd, Tb, Dy, Ho, Er, Tm, Yb and Lu, preferably Sm, Eu, Pr and Yb. The preferred promoter comprises samarium.

Methods of Support Preparation

This invention covers several embodiments of means for making catalyst supports disclosed earlier. All method embodiments comprise an application step of at least one stabilizing agent followed by a high temperature treatment.

Preferably the stabilizing agent comprises a rare earth metal. The rare earth metal is selected from lanthanum, cerium, praseodymium, neodymium, samarium, or combinations. The aluminum-containing precursor may comprise at least one material selected from the group consisting of an oxide of aluminum, an aluminum salt, a salt of aluminum, an alkoxide of aluminum, a hydroxide of aluminum and any combination thereof. The aluminum-containing precursor comprises an aluminum structure selected from the group consisting of bayerite, gibbsite, boehmite, pseudo-boehmite, bauxite, gamma-alumina, delta-alumina, chi-alumina, rho-alumina, kappa-alumina, eta-alumina, theta-alumina, and any combinations thereof. The aluminum-containing precursor preferably comprises a transition alumina selected from the group consisting of gamma-alumina, delta-alumina, chi-alumina, rho-alumina, kappa-alumina, eta-alumina, theta-alumina, and combinations thereof. In a preferred embodiment, the aluminum-containing precursor comprises mostly gamma-alumina.

The gamma-alumina used as the aluminum-containing precursor in the present method of preparation of the catalyst support possesses a desired profile of physical characteristics with respect to, say, morphology and pore structure. Preferably, the gamma-alumina of the present method possesses a surface area between about 100 m$^2$/g and about 300 m$^2$/g; more preferably between about 120 m$^2$/g and about 300 m$^2$/g, but most preferably between about 120 m$^2$/g and about 220 m$^2$/g. The gamma-alumina as used in the present method further possesses a pore volume of at least about 0.2 ml/g. Any aluminum oxide, which meets these requirements in surface area and pore dimension, is called for the purpose of this patent gamma-alumina.

It should be understood that the aluminum-containing precursor could be pre-treated prior to calcination or application of the stabilizing agent. The pre-treatment could be heating, spray-drying to for example adjust particle sizes, dehydrating, drying, steaming or calcining. When the aluminum-containing precursor comprises an aluminum oxide such as gamma-alumina, steaming can be done at conditions sufficient to transform the aluminum oxide into a hydrated form of said aluminum oxide, such as boehmite or pseudo-boehmite or gibbsite.

The present process for preparing a stabilized alumina support may further comprise steaming the aluminum-containing precursor at conditions sufficient to at least partially transform the aluminum-containing precursor into a boehmite or pseudo-boehmite wherein steaming is defined as subjecting a given material, within the confines of an autoclave or other suitable device, to an atmosphere comprising a saturated or under-saturated water vapor at conditions of elevated temperature and elevated water partial pressure.

In one aspect, the steaming of the modified alumina precursor is preferably performed at a temperature ranging from 150° C. to 500° C., more preferably ranging from 180° C. to 300° C., and most preferably ranging from 200° C. to 250° C.; a water vapor partial pressure preferably ranging from 1 bar to 40 bars, more preferably ranging from 4 bars to 20 bars, and most preferably from 10 bars to 20 bars; and an interval of time preferably from 0.5 hour to 10 hours, and most preferably 0.5 hour to 4 hours. Preferably, under these steaming conditions, the deposited aluminum-containing precursor is at least partially transformed to at least one phase selected from the group boehmite, pseudo-boehmite and the combination thereof. A pseudo-boehmite refers to a monohydrate of alumina having a crystal structure corresponding to that of boehmite but having low crystallinity or ultrafine particle size. Alternatively, the optional steaming of the modified aluminum-containing precursor may comprise same conditions of temperature and time as above, but with a reduced water vapor partial pressure preferably ranging from 1 bar to 5 bar, and more preferably ranging from 2 bars to 4 bars.

The compound or precursor of a stabilizing agent can be in the form of salt, acid, oxide, hydroxide, oxyhydroxide, carbide, and the like Preferably the compound or precursor of a stabilizing agent is an oxide or a salt (such as carbonate, acetate, nitrate, chloride, or oxalate). The stabilizing agent comprises at least one element selected from the group consisting of aluminum, boron, silicon, gallium, selenium, rare earth metals, transition metals, alkali earth metals, their corresponding oxides or ions, preferably at least one element selected from the group consisting of B, Si, Ga, Se, La, Ce, Pr, Nd, Pm, Sm, Eu, Gd, Th, Dy, Ho, Er, Tm, Yb, Lu, and their corresponding oxides or ions. More preferably, the stabilizing agent comprises La, Pr, Ce, Eu, Yb, Sm, their corresponding oxides, their corresponding ions, or any combinations thereof. Preferably the compound or precursor of the stabilizing agent comprises a nitrate salt or a chloride salt, as for example only La(NO$_3$)$_3$, or Al(NO$_3$). It should be understood that more than one stabilizing agent or more than one compound or precursor of a stabilizing agent can be used.

The stabilizing agent can be applied to the aluminum-containing precursor by means of different techniques. For example only, application methods can be spray-drying, impregnation, co-precipitation, chemical vapor deposition, and the like. It should also be understood that any combination of techniques or multiple steps of the same technique could be used to applying a stabilizing agent.

One preferred technique for applying the stabilizing agent is impregnation, particularly incipient wetness impregnation. When the application is done via impregnation, a drying step at temperatures between 80° C. and 150° C. is performed on the modified aluminum-containing precursor prior to calcination.

In another embodiment, the modified aluminum-containing precursor is derived from the aluminum-containing precursor by contacting the aluminum-containing precursor with the stabilizing agent so as to form a support material and treating the support material so as to form a hydrothermally stable support. Contacting the modified aluminum-containing precursor with the stabilizing agent preferably includes dispersing the aluminum-containing precursor in a solvent so as to form a sol, adding a compound of the stabilizing agent to the sol, and spraydrying the sol so as to form the support material. It should be understood that more than one stabilizing agents or more than one compound or precursors of a stabilizing agent can be added to the sol. Alternatively, one stabilizing agent can be incorporated into the support by means of the aforementioned techniques. Alternatively, two or more stabilizing agents can be incorporated into the support by means of the aforementioned techniques. The preferred stabilizing agent comprises at least one rare earth selected from the group consisting of lanthanum, cerium, praseodymium, and neodymium.

In another embodiment, a method of making a stabilized alumina support further comprises applying at least one promoter to the stabilized alumina support. In some embodiments, the promoter comprises an element selected from the group consisting of La, Ce, Pr, Nd, Pm, Sm, Eu, Gd, Th, Dy, Ho, Er, Tm, Yb and Lu, preferably Sm, Eu, Pr and Yb. It is believed that the introduction of a lanthanide oxide, especially Sm$_2$O$_3$, on the stabilized alumina support surface before deposition of active metal seems to further enhance the metal-support interaction, and that the active metal also disperses better on the surface of stabilized support comprising an aluminum oxide and a rare earth aluminate.

Methods of Preparation of High Surface Area Catalyst Support Comprising Theta-Alumina In particular, the present invention discloses, in one aspect, a method of making a catalyst support comprising calcining an aluminum-comprising precursor in a manner effective for converting at least a portion of the aluminum-comprising precursor to an alumina support comprising a majority of theta-alumina, and substantially free of gamma-alumina. The calcination is preferably performed after an application of a stabilizing agent to the aluminum-comprising precursor, wherein the stabilizing agent preferably comprises a rare earth metal.

The calcination is done at a high temperature greater than 800° C., preferably not greater than 1,300° C. The calcination temperature could be selected based on the highest temperature the catalyst would likely experience in operation, i.e. the catalytic reactor.

When the aluminum-comprising precursor comprises mainly gamma-alumina, the calcination temperature is preferably selected such that it is above the minimum temperature necessary to start the phase transformation from gamma-alumina to another transition alumina phase between the low-temperature metastable transition gamma-alumina and the high-temperature thermodynamically stable alpha-alumina, but below about the minimum temperature necessary to start the phase transformation from said transition alumina to alpha-alumina. The other transition alumina (i.e., which excludes gamma-alumina) is preferably theta-alumina, but could comprise low amounts of other transition alumina phases. The calcination temperature is preferably selected such that substantially all of the gamma-alumina phase is transformed into other alumina phases, particularly to theta-alumina or a combination of theta-alumina and alpha-alumina. For example, if a good portion of theta-alumina is desired in the support, the calcination following the application step of a rare earth compound to a gamma-alumina, should be performed at a temperature preferably between 800° C. and 1,100° C., more preferably between 900° C. and 1,000° C. Under these conditions of calcination temperatures, it is most likely that the formation of rare earth hexaaluminates would be minimized. The heat treatment is preferably performed, for a time period between 3 to 24 hours.

The calcination can be performed under an oxidizing atmosphere, either statically or under a flow of gas, preferably in static air or under a flow of a gas comprising diatomic oxygen. Steam, either by itself or in combination with air, can also be used.

The calcination can be done at a pressure between 0 and 500 psia; preferably under atmospheric pressure (about 101 psia), or under a subatmospheric pressure such as in a vacuum, or at slightly above atmospheric pressure (101-200 psia).

Preparation of Thermally Stable Catalyst Support Comprising a Rare Earth Aluminate with an Al:Ln>5:

An alternate preferred method comprises applying a compound of a stabilizing agent to an alumina support precursor; drying the modified alumina precursor; and treating the dried modified alumina precursor with heat in a manner effective for converting at least a portion of the aluminum-comprising material and a portion of said stabilizing agent to an aluminum-containing precursor to an aluminate of said stabilizing agent. The stabilizing agent comprises preferably a rare earth metal.

When the stabilizing agent comprises preferably a rare earth metal, the heat treatment conditions such as temperature and time are preferably selected such that at least a portion of the aluminum-comprising material is transformed to the aluminate of said rare earth metal. This rare earth aluminate could comprise a hexaaluminate structure, a beta-alumina structure, a monoclinic structure, a perovskite-type structure, or combinations thereof, but preferably, the rare earth aluminate comprises a beta-alumina structure, an hexaaluminate structure, or any combinations thereof.

In a specific example, when the aluminum-comprising precursor comprises mainly a gamma-alumina material, if the formation of rare earth aluminate with a high Al:Ln ratio (i.e., greater than 5:1) is desired in the support, the heat treatment step following the application step of a rare earth compound to said gamma-alumina material and the drying step, should be performed at a temperature preferably between 1,000° C. and 1,600° C., more preferably between 1,100° C. and 1,400° C. The heat treatment is preferably performed, for a time period between 3 to 24 hours.

The heat treatment can be performed under an oxidizing atmosphere (and in this case is called calcination), either statically or under a flow of gas, preferably in static air or under a flow of a gas comprising diatomic oxygen. Steam, either by itself or in combination with air, can also be used, as Nair et al. (Journal of American Ceramic Society, 2000, vol. 83, pp. 1942-1946) indicated that no difference in surface area was observed when the lanthanum hexaaluminate, $(La_2O_3).11\,(Al_2O_3)$, was calcined in air or steam.

The holding time at high calcination temperatures is expected to be greater than a calcination time necessary for a typical phase transformation from gamma-alumina to theta-alumina to alpha-alumina, as the growth of rare earth hexaaluminates or beta-alumina structures is quite slow. Therefore one person skilled in the art should select a time period for heat treatment long enough to transform most of the rare earth compound to a rare earth hexaaluminate.

Calcining conditions can be also selected such that calcination is effective to convert a portion of the rare earth metal solution into a second rare earth aluminate but which comprises a low aluminum to rare earth metal molar ratio, such as a perovskite structure. It is possible that if the rare earth metal is not completely transformed to hexaaluminate, it could be converted in the formation of rare earth oxides and/or other rare earth aluminates, such as a pervoskite type, which do not generate a higher surface area than the hexaaluminate structures are known to do. However it should be appreciated that in some cases, the combination of rare earth aluminates with high aluminum to rare earth molar ratio (i.e., between 11:1 and 14:1 for hexaaluminate-like structure or beta-alumina structures) and rare earth aluminates with low aluminum to rare earth molar ratios (i.e., 5:3 for garnet structure, 1:1 for perovskite structure, and 1:2 for monoclinic structure) might be desirable as the former species are known to increase the surface area and the later species are known to inhibit the surface diffusion of species responsible for sintering.

Calcining can be also effective to convert a portion of the rare earth metal solution into an oxide of said rare earth metal, said rare earth oxide consisting essentially of rare earth metal atoms and oxygen atoms.

The amount of a compound of a stabilizing agent applied to an aluminum-containing precursor is sufficient so as to obtain a stabilizing agent content in the support between about 1 wt % and about 20 wt %. When the stabilizing agent comprises a rare earth metal, the amount of a compound of a rare earth compound applied to the aluminum-containing precursor is sufficient so as to obtain a rare earth content in the support between about 1 wt % and about 20 wt %, preferably between about 1 wt % and about 10 wt %, more preferably between about 3 wt % and about 8 wt %, and still more preferably between about 4 wt % and about 8 wt %.

More specifically, a method for making a thermally stable aluminum-based support with a high surface area comprises impregnating a solution of a rare earth metal onto an aluminum-containing precursor; drying impregnated aluminum-containing precursor; and calcining in a manner effective to convert one portion of said aluminum-containing precursor to an aluminum oxide phase comprising alpha-alumina, theta-alumina, or combinations thereof; and to convert another portion of said aluminum-containing precursor with at least a fraction of said rare earth metal to a rare earth aluminate with a molar ratio of aluminum to rare earth metal greater than 5:1. After calcining, the material comprises between about 1 wt % and 100 wt % of said rare earth aluminate, preferably between about 1 wt % and about 50 wt % of said rare earth aluminate, more preferably between about 5 wt % and about 45 wt % of the rare earth aluminate, and still more preferably between about 10 wt % and about 40 wt % of the rare earth aluminate. The solution of rare earth metal comprises more than one rare earth metal. Drying is preferably performed at a temperature above 75° C., preferably between 75° C. and 150° C.

The calcination temperature is preferably selected such that at least a portion of the aluminum-containing precursor is converted to another alumina phase, so as to obtain at least a theta-alumina phase and/or alpha-alumina phase, whereas another portion of the aluminum-containing precursor is transformed with a stabilizing agent to an aluminate of said stabilizing agent.

When the stabilizing agent comprises a rare earth metal, preferably the calcination temperature is chosen to favor the formation of a solid solution of aluminum comprising rare earth aluminates. For this particular embodiment, the temperature is greater than about 1,100° C. The calcination temperature is preferably between 1,100° C. and 1,400° C.; more preferably between about 1,200° C. and about 1,300° C. The calcination time will depend greatly on the type of equipment used, whether commercial or lab-scale. It is preferred in the laboratory scale for 10-g to 50-g samples to use a calcination time of at least about 3 hours to achieve at least a content of 5 wt % by weight of rare earth hexaaluminates.

Calcining can be also effective to convert a portion of the rare earth metal solution into an oxide of said rare earth metal, said rare earth oxide consisting essentially of rare earth metal atoms and oxygen atoms.

Calcining can be also effective to convert a portion of the rare earth metal solution into a second rare earth aluminate but which comprises a low aluminum to rare earth metal molar ratio, such as a perovskite structure.

Method of Catalyst Preparation

The present invention further presents a method of making a partial oxidation catalyst wherein said method comprises optionally applying a compound of one or more promoters to a stabilized support of this invention and calcining the applied stabilized support at temperatures greater than 600° C., preferably between about 800° C. and about 1,400° C., more preferably between about 900° C. and about 1,300° C. to form a catalyst precursor; depositing a compound of at least one active metals to the catalyst precursor; calcining the deposited catalyst precursor at temperatures between about 300° C. and about 1,200° C., preferably between about 500° C. and about 1,100° C. The stabilized support can be any of the supports disclosed earlier. A preferred support at least comprises a rare earth hexaluminate with a Al:Ln ratio greater than 5:1. The stabilized support may further include an aluminum oxide phase such as comprising theta-alumina, alpha-alumina, or combinations thereof. The stabilized support preferably include between about 1 wt % and 50 wt % of said rare earth aluminate with a Al:Ln ratio greater than 5:1.

The compound of the promoter can be in the form of salt, acid, oxide, hydroxide, oxyhydroxide, carbide, and the like. Preferably the compound of the promoter is a salt. The promoter comprises at least one element selected from the group consisting of La, Ce, Pr, Nd, Pm, Sm, Eu, Gd, Th, Dy, Ho, Er, Tm, Yb, Lu, and their corresponding oxides or ions. Preferably the promoter comprises either Pr, Yb, Eu, Sm, their corresponding oxides or ions, or any combinations thereof. Preferably the compound of the promoter comprises a nitrate salt, as for example only $Sm(NO_3)_3$ or $La(NO_3)$. It should be understood that more than one promoter or more than one compound or precursor of a promoter can be used.

The promoter can be deposited into the modified alumina by means of different techniques. For example only, deposition methods can be impregnation, co-precipitation, chemical vapor deposition, and the like. The preferred technique for depositing the promoter is impregnation.

When the deposition of the promoter is done via impregnation, optionally a drying step at temperatures between 75° C. and 150° C. is performed on the deposited modified alumina prior to calcination.

The compound of the active metal can be in the form of salt, acid, oxide, hydroxide, oxyhydroxide, carbide, and the like. Preferably the compound of the active metal is a salt. The active metal comprises one element selected from the group consisting of metals from Groups 8, 9, and 10 of the Periodic Table, rhenium, tungsten, and any combinations thereof. Preferably the active metal for syngas catalyst comprises rhodium, iridium, ruthenium, rhenium, or any combinations thereof. Preferably the compound of the active metal is a nitrate or a chloride salt, as for example only $Rh(NO_3)_3$ or $RhCl_3$. It should be understood that more than one active metal or more than one compound of an active metal can be used. When two active metals are used in the syngas catalyst, it is preferred that at least rhodium is selected as one metal, that the other metal is selected from the active metal list above for syngas catalyst, and that the loading of both metals is such so as to form a rhodium alloy.

The active metal can be deposited on the catalyst precursor (on promoted or unpromoted stabilized alumina support) by means of different techniques. For example only, deposition methods can be impregnation, co-precipitation, chemical vapor deposition, and the like. The preferred technique for depositing the active metal is impregnation.

When the deposition of the active metal is done via impregnation, optionally a drying step at temperatures between 75° C. and 150° C. is performed on the deposited catalyst precursor prior to calcination.

Even though the applications of both promoter and active metal to the stabilized supports are described as separate steps, the application of both promoter(s) and active metal can be done simultaneously.

Finally, after the application, drying, calcination steps to incorporate at least one active metal and an optional promoter into the support to make a catalyst, an activation step may be necessary. In some embodiments, the activation step is not required; therefore the activation step can be viewed as an optional step. The activation could comprise contacting the catalyst to a reducing atmosphere so as to convert at least a portion of the active metal to a zero-valent state. The reducing atmosphere preferably comprises hydrogen, but could also contain other gases (such as nitrogen, methane, carbon monoxide), which are preferably not poisons to the catalyst and/or do not chemically react with it.

Method of Producing Synthesis Gas

According to the present invention, a syngas reactor can comprise any of the synthesis gas technology and/or methods known in the art. The hydrocarbon-containing feed is almost exclusively obtained as natural gas. However, the most important component is generally methane. Natural gas comprise at least 50% methane and as much as 10% or more ethane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Preferably, the feed comprises at least about 50% by volume methane, more preferably at least 80% by volume, and most preferably at least 90% by volume methane. The feed can also comprise as much as 10% ethane. Similarly, the oxygen-containing gas may come from a variety of sources and will be somewhat dependent upon the nature of the reaction being used. For example, a partial oxidation reaction requires diatomic oxygen as a feedstock, while steam reforming requires only steam. According to the preferred embodiment of the present invention, partial oxidation is assumed for at least part of the syngas production reaction.

Regardless of the source, the hydrocarbon-containing feed and the oxygen-containing feed are reacted under catalytic conditions. Improved catalyst compositions in accordance with the present invention are described herein. They generally are comprised of a catalytic metal, some alloyed, that has been reduced to its active form and with one or more optional promoters on a stabilized aluminum-based support.

It has been discovered that the stabilization of an aluminum-based support by the presence of at least one rare earth aluminate with a molar ratio of aluminum-to-rare earth metal greater than 5:1 results in obtaining a catalytic support suitable for high-temperature reactions such as syngas production via partial oxidation.

Thus this invention relates to a method for making synthesis gas comprising converting a gaseous hydrocarbon stream and an oxygen-containing stream over a partial oxidation catalyst, to make a product stream comprising CO and $H_2$, wherein said partial oxidation catalyst includes an active ingredient comprising rhodium, iridium, platinum, palladium, ruthenium, or combinations thereof; and a support comprising a rare earth aluminate, said rare earth aluminate having a molar ratio of aluminum to rare earth metal greater than 5:1. The rare earth aluminate preferably has a molar ratio of aluminum to rare earth metal between 11:1 and 14:1. The rare earth aluminate preferably has a hexaaluminate-like structure, a beta-alumina like structure, or combinations thereof. The catalytic support can contain from about 1 wt % to 100 wt % of the rare earth aluminate. In some preferred embodiments, the catalytic support contains from about 1 wt % to about 50 wt % of the rare earth aluminate. In other embodiments, the thermally stable aluminum-based catalyst support could comprise between 40 wt % and 100 wt % of the rare earth aluminate. In some alternate embodiments, the support is a rare earth aluminate or a mixture of rare earth aluminates with an aluminum-to-rare earth metal molar ratio greater than 5:1, such as a lanthanum hexaaluminate-like material or a lanthanum beta-alumina-like material.

In addition, it has been discovered that the stabilization of an aluminum-based support by the addition of at least one stabilizing agent to a transition alumina between gamma-alumina and alpha-alumina (but excluding gamma-alumina) results in a high-surface area catalytic support suitable for high-temperature reactions.

This invention also relates to a method for making synthesis gas comprising converting a gaseous hydrocarbon stream and an oxygen-containing stream over a partial oxidation catalyst, to make a product stream comprising CO and $H_2$, wherein said partial oxidation catalyst includes an active ingredient comprising rhodium, iridium, platinum, palladium, ruthenium, or combinations thereof, and a support comprising a transition alumina excluding gamma-alumina, and at least one stabilizing agent. The transition alumina in the support preferably comprises theta-alumina. The support may also comprise alpha-alumina. The stabilizing agent is preferably a rare earth metal. The stabilizing agent more preferably includes a lanthanide metal selected from the group consisting of lanthanum, cerium, neodymium, praseodymium, samarium, and combinations thereof, but may further include any element from Groups 1-14 of the Periodic Table (new IUPAC notation) such as an alkali metal, an alkali earth metal, an additional rare earth metal, or a transition metal.

The syngas catalyst compositions according to the present invention comprise an active metal selected from the group consisting of metals from Group 8, 9, and 10 of the Periodic Table, rhenium, tungsten, and any combinations thereof, preferably a metal from Group 8, 9, and 10 of the Periodic Table and any combinations thereof, more preferably rhodium, iridium, ruthenium, or combinations thereof.

In some embodiments when the active metal is rhodium, rhodium is comprised in a high melting point alloy with another metal. It has been discovered that in addition to the enhanced thermal stability of the support, the high melting point rhodium alloys used in some of these syngas catalysts confer additional thermally stability than non-alloy rhodium catalysts, which leads to enhanced ability of the catalyst to resist various deactivation phenomena.

It is well known that during syngas reactions, several undesired processes, such as coking (carbon deposition), metal migration, and sintering of metal and/or the support, can occur and severely deteriorate catalytic performance. The catalyst compositions of the present invention are better able to resist at least one of these phenomena over longer periods of time than prior art catalysts. As a consequence, these novel rhodium-containing catalysts on stabilized alumina comprising mainly theta alumina can maintain high methane conversion as well as high CO and $H_2$ selectivity over extended periods of time with little to no deactivation of the syngas catalyst.

The support structure of these catalysts can be in the form of a monolith or can be in the form of divided or discrete structures or particulates. Particulates are preferred. Small support particles tend to be more useful in fluidized beds. Preferably at least a majority (i.e., >50%) of the particles or distinct structures have a maximum characteristic length (i.e., longest dimension) of less than six millimeters, preferably less than three millimeters. According to some embodiments, the divided catalyst structures have a diameter or longest characteristic dimension of about 0.25 mm to about 6.4 mm (about $\frac{1}{100}$" to about $\frac{1}{4}$"), preferably between about 0.5 mm and about 4.0 mm. In other embodiments they are in the range of about 50 microns to 6 mm.

The hydrocarbon feedstock, and the oxygen-containing gas may be passed over the catalyst at any of a variety of space velocities. Space velocities for the process, stated as gas hourly space velocity (GHSV), are in the range of about 20,000 $hr^{-1}$ to about 100,000,000 $hr^{-1}$, more preferably, of about 100,000 $hr^{-1}$ to about 10,000,000 $hr^{-1}$, most preferably of about 400,000 $hr^{-1}$ to about 1,000,000 $hr^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $hr^{-1}$. Under these operating conditions a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time less than 10 milliseconds is highly preferred. The duration or degree of contact is preferably regulated so as to produce a favorable balance between competing reactions and to produce sufficient heat to maintain the catalyst at the desired temperature.

In order to obtain the desired high space velocities, the process is operated at atmospheric or superatmospheric pressures. The pressures may be in the range of about 100 kPa to about 4,000 kPa (about 1-40 atm), preferably from about 200 kPa to about 3,200 kPa (about 2-32 atm).

The process is preferably operated at a temperature in the range of about 350° C. to about 2,000° C. More preferably, the temperature is maintained in the range 400° C.-1,600° C., as measured at the reactor outlet.

The catalysts of the present invention should maintain hydrocarbon conversion of equal to or greater than about 85%, preferably equal to or greater than about 90% after 100 hours of operation when operating at pressures of greater than 2 atmospheres. Likewise, the catalysts of the present invention should maintain CO and $H_2$ selectivity of equal to or greater than about 85%, preferably equal to or greater than about 90% after 100 hours of operation when operating at pressures of greater than 2 atmospheres.

The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. The synthesis gas product, i.e. syngas, is then ready to be used, treated, or directed to its intended purpose. The product gas mixture emerging from the syngas reactor may be routed directly into any of a variety of applications, preferably at pressure. For example, in the instant case some or all of the syngas can be used as a feedstock in subsequent synthesis processes, such as Fischer-Tropsch synthesis, alcohol (particularly methanol) synthesis, hydrogen production, hydroformylation, or any other use for syngas. One preferred such application for the CO and $H_2$ product stream is for producing via the Fischer-Tropsch reaction synthesis higher molecular weight hydrocarbons, such as $C_{5+}$ hydrocarbons.

Syngas is typically at a temperature of about 600° C.-1,500° C. when leaving a syngas reactor. The syngas must be transitioned to be useable in a Fischer-Tropsch or other synthesis reactors, which operate at lower temperatures of about 160° C. to 400° C. The syngas is typically cooled, dehydrated (i.e., taken below 100° C. to knock out water) and compressed during the transition phase. Thus, in the transition of syngas from the syngas reactor to for example a Fischer-Tropsch reactor, the syngas stream may experience a temperature window of 50° C. to 1,500° C.

In addition, the present invention contemplates an improved method for converting hydrocarbon gas to liquid hydrocarbons using the novel catalyst compositions described herein for synthesis gas production from light hydrocarbons. Thus, the invention also relates to processes for converting hydrocarbon-containing gas to liquid products via an integrated syngas to Fischer-Tropsch, methanol or other process.

Hydrocarbon Synthesis from Synthesis Gas

The synthesis gas (a mixture of hydrogen and carbon monoxide) produced by the use of catalysts as described above is assumed to comprise at least a portion of the feed to a Fischer-Tropsch reactor. The Fischer-Tropsch reactor can comprise any of the Fischer-Tropsch technology and/or methods known in the art. The feed to the Fischer-Tropsch comprises a synthesis gas (or syngas) with a hydrogen to carbon monoxide molar ratio between 0.67:1 and 5:1 but is generally deliberately adjusted to a desired ratio of between about 1:4:1 to 2.3:1, preferably approximately 1.7:1 to 2.2:1. The syngas is then contacted with a Fischer-Tropsch catalyst. Fischer-Tropsch catalysts are well known in the art and generally comprise a catalytically active metal and a promoter. The most common catalytic metals are metals from Groups 8, 9, 10 of the Periodic Table, such as cobalt, nickel, ruthenium, and iron or mixtures thereof. They may also comprise a support structure. The support is generally alumina, titania, zirconia, silica, or mixtures thereof. In some embodiments, it is envisioned that the Fischer-Tropsch catalyst may be supported on a stabilized alumina as described in this invention. Fischer-Tropsch reactors use fixed and fluid type conventional catalyst beds as well as slurry bubble columns. The literature is replete with particular embodiments of Fischer-Tropsch reactors and Fischer-Tropsch catalyst compositions. As the syngas feedstock contacts the catalyst, the hydrocarbon synthesis reaction takes place. The Fischer-Tropsch product contains a wide distribution of hydrocarbon products from $C_5$ to greater than $C_{100}$. The Fischer-Tropsch process is typically run in a continuous mode. In this mode, the gas hourly space velocity through the reaction zone typically may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume (the volume of reactant gases is at standard pressure of 1 atm or 101 kPa and standard temperature of 0° C.; the reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst). The reaction zone temperature is typically in the range from about 160° C. to about 300° C. Preferably, the reaction zone is operated at conversion promoting conditions at temperatures from about 190° C. to about 260° C., more preferably between about 200° C. and about 230° C. The reaction zone pressure is typically in the range of about 80 psia (552 kPa) to about 1,000 psia (6895 kPa), more preferably from 80 psia (552 kPa) to about 800 psia (5515 kPa), and still more preferably, from about 140 psia (965 kPa) to about 750 psia (5170 kPa). Most preferably, the reaction zone pressure is from about 140 psia (965 kPa) to about 500 psia (3447 kPa).

Definitions

For purposes of the present disclosure, certain terms are intended to have the following meanings.

"Active metal" refers to any metal that is present on a catalyst that is active for catalyzing a particular reaction. Active metals may also be referred to as catalytic metals.

A "promoter" is one or more substances, such as a metal or a metal oxide or metal ion that enhances an active metal's catalytic activity in a particular process, such as a CPOX process (e.g., increase conversion of the reactant and/or selectivity for the desired product). In some instances a particular promoter may additionally provide another function, such as aiding in dispersion of active metal or aiding in stabilizing a support structure or aiding in reduction of the active metal.

A "stabilizing agent" is one or more substances, comprising an element from the Periodic Table of Elements, or an oxide or ion of such element, that modifies at least one physical property of the support material that it is deposited onto, such as for example structure of crystal lattice, mechanical strength, and/or morphology.

A rare earth "aluminate" refers to a compounds or related materials in the system Ln-Al—O, where Ln, Al and O represent the rare earth metal, aluminum, oxygen, respectively.

With respect to the catalytic reaction such as partial oxidation of light hydrocarbons such as methane or natural gas to produce synthesis gas or conversion of synthesis gas to hydrocarbons, references to "catalyst stability" refer to maintenance of at least one of the following criteria: level of conversion of the reactants, productivity, selectivity for the desired products, physical and chemical stability of the catalyst, lifetime of the catalyst on stream, and resistance of the catalyst to deactivation.

A compound of an element is a chemical entity that contains the atoms of said element (whether the element is a catalytically active metal, a promoter, or a stabilizing agent).

A transition alumina is typically defined as any crystalline aluminum oxide phase which is obtained by dehydration from an aluminum hydrate precursor such as boehmite or pseudo-boehmite, gibbsite, or bayerite, to ultimately the thermodynamically stable phase of alumina, alpha-alumina. Transition aluminas comprise gamma-alumina, theta-alumina, delta-alumina, eta-alumina, rho-alumina, chi-alumina, and kappa-alumina.

Gamma-alumina and theta-alumina are two metastable phases of aluminum oxide observed along the dehydration sequence of boehmite upon thermal treatment before conversion to the final product alpha-alumina (see for example, 'Transformation of gamma-alumina to theta-alumina' by Cai, Physical Review Letters, 2002, vol. 89, pp. 235501).

Theta-alumina is a metastable phase of alumina with aluminum atoms both octahedrally and tetrahedrally coordinated. The local cation coordinations in theta-alumina are close to those in gamma-alumina but different from alpha-alumina. Theta-alumina has an indirect energy band gap, which is 1.6 eV smaller than that, of alumina. The linear optical properties of theta-alumina are very close to those of alpha-alumina. [Mo and Ching (1998), Session W19, 1998 March Meeting of The American Physical Society, Mar. 16-20, 1998, Los Angeles, Calif.].

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

An aluminum-containing precursor was obtained as gamma-$Al_2O_3$ spheres from Davison, with the following characteristics: a size in the range of 1.2 to 1.4 mm (average diameter of 1.3 mm.), a bulk density of 0.44 g/ml, a surface area and pore volume measure with $N_2$ adsorption of 143 $m^2$/g and 0.75 ml/g respectively. For a control, supports using $\gamma$-$Al_2O_3$ spheres were formed using no modifier by calcination at different calcination temperatures between 600 and 1,300° C. for 3 hours. For generating lanthanum-modified supports, $Al_2O_3$ spheres were impregnated with a lanthanum nitrate ($La(NO_3)_3$) solution, dried in an oven at 120° C. overnight, and then calcined at different calcination temperatures between 600 and 1,300° C. for 3 hours. The $\gamma$-$Al_2O_3$ spheres were impregnated with an aqueous solution containing desired amount of $La(NO_3)_3$ so that the lanthanum oxide ($La_2O_3$) amount in the final material after drying and calcinations is approximately 3 wt % or 10 wt % lanthanum oxide by weight of the total support (this corresponds to a weight content of about 2.56 wt % and 8.53 wt % La and a molar content of 0.94 mol % and 3.1 mol % of $La_2O_3$, respectively).

Figure 2A:
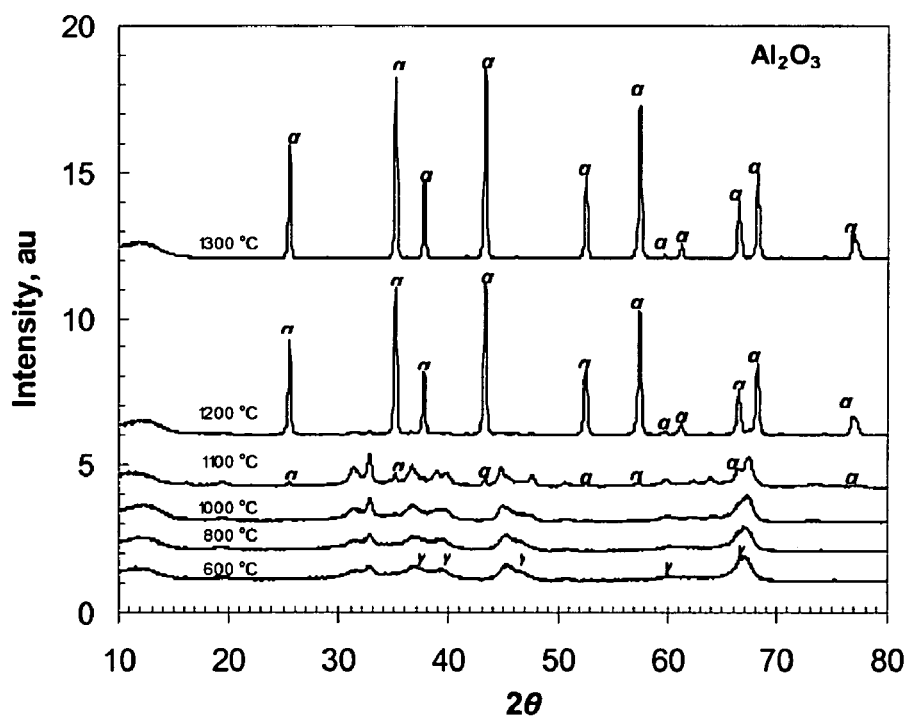
FIGS. 2a, 2b and 2c represent the XRD analysis of materials comprising various loadings of lanthanum applied to gamma-alumina and calcined at different temperatures.
Figure 2B:
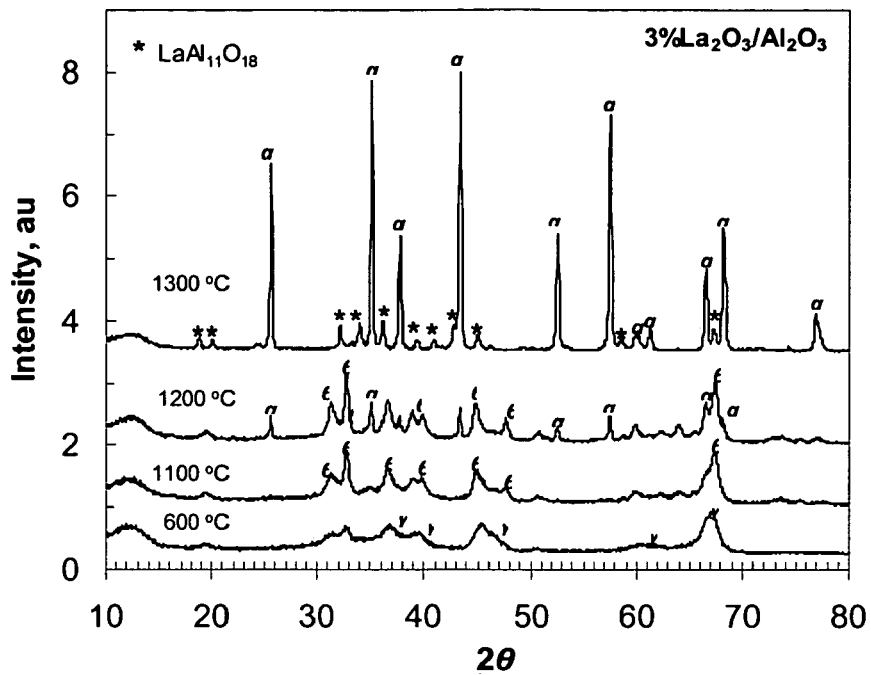
Figure 2C:
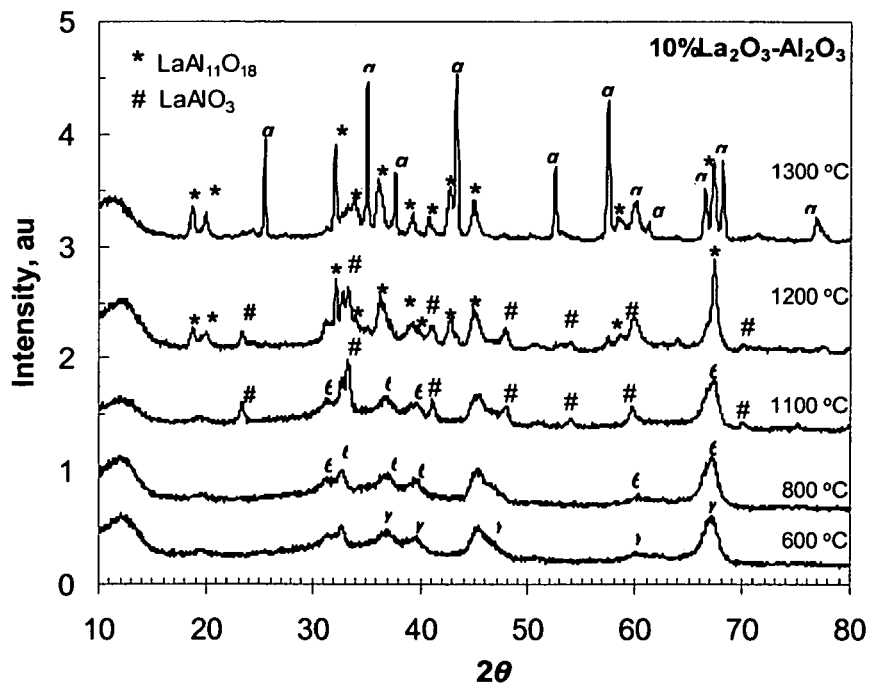

FIGS. 2$a$, 2$b$ and 2$c$ represent the X-Ray Diffraction patterns of several support materials comprising respectively no lanthanum, 3 wt % $La_2O_3$ and 10 wt % $La_2O_3$, all obtained after an impregnation and a 3-hour calcination at different temperatures. When one compares the XRD traces of undoped alumina (FIG. 2$a$) and the 3 wt % $La_2O_3$ on alumina in (FIG. 2$b$) that were calcined at 1,100° C. or 1,200° C., it is noted that $\alpha$-$Al_2O_3$ phase was present in higher percentage in undoped alumina ($Al_2O_3$) than in 3 wt % La on alumina (3 wt % $La_2O_3$/$Al_2O_3$). The $\alpha$-$Al_2O_3$ phase was detected already in the undoped $Al_2O_3$ calcined at 1,100° C. while $\alpha$-$Al_2O_3$ peaks in the 1,100° C. calcined 3 wt % $La_2O_3$/$A_2O_3$ were negligible. The difference in $Al_2O_3$ phase compositions of those two samples is more obvious for the 1,200° C. calcinated samples—$\alpha$ phase is the predominant phase in undoped $Al_2O_3$ while $\theta$-$Al_2O_3$ is the main phase in 3 wt % $La_2O_3$/$A_2O_3$ sample, suggesting a lanthanum dopant with 3 wt % $La_2O_3$ loading is effective in preventing $\theta$ phase from transforming into $\alpha$ phase at 1,200° C. Nevertheless, the thermodynamically stable $\alpha$ phase becomes the dominant phase in both undoped and 3 wt % $La_2O_3$/$A_2O_3$ after calcination at 1,300° C. In order to further retard the $\alpha$-$Al_2O_3$ phase formation and to maintain a relatively high surface area after 1,300° C. calcination, the $La_2O_3$ doping level needs to be increased. The XRD results obtained with 10% $La_2O_3$/$Al_2O_3$ samples calcined at different temperatures indicate that La—Al—O mixed oxide compounds were formed upon calcination at high temperatures (FIG. 2$c$). The presence of perovskite-structured $LaAlO_3$ compound was detected in the 1,100° C. calcined sample. A hexaluminate-type La—Al—O compound, $LaAl_{11}O_{18}$ emerged after 1,200° C. calcination at the expense of $LaAlO_3$, which completely disappeared in the 1,300° C. calcined 10% $La_2O_3$/$Al_2O_3$. Based on the XRD results in FIG. 2$c$, we conclude that the sequences of $La_2O_3$+ $Al_2O_3$ reaction at high temperatures follow:

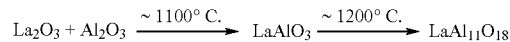

$$La_2O_3 + Al_2O_3 \xrightarrow{\sim 1100° C.} LaAlO_3 \xrightarrow{\sim 1200° C.} LaAl_{11}O_{18}$$

For the 1,200° C.-calcined 10% $La_2O_3$/$Al_2O_3$ sample, the intensities of XRD diffraction peaks from $\alpha$-$Al_2O_3$ are much lower than those in the 1,200° C.-calcined 3% $La_2O_3$/$Al_2O_3$ sample, suggesting the retardation of $\alpha$-$Al_2O_3$ formation is more effective at higher $La_2O_3$ doping levels. Moreover, when comparing the XRD traces of 1,300° C.-calcined sample in FIG. 2$b$ and FIG. 2$c$, one may notice that the $\alpha$-$Al_2O_3$ phase in the 10% $La_2O_3$/$Al_2O_3$ sample is not as predominant as in 3% $La_2O_3$/$Al_2O_3$ (FIG. 2$c$). It seems that there is an absence of dominant $\alpha$-$Al_2O_3$ phase and the present of more thermal stable $LaAl_{11}O_{18}$ in the 1,300° C. calcined samples (FIG. 2$c$) in the 10% $La_2O_3$/$Al_2O_3$ support than those of unmodified $Al_2O_3$ and 3% $La_2O_3$/$Al_2O_3$.

In order to find the optimum $La_2O_3$ doping level to stabilize the $Al_2O_3$ structure, $La_2O_3$ doping level was varied from 3 wt % to 10 wt %. The BET surface area and pore volume of $La_2O_3$/$Al_2O_3$ of different $La_2O_3$ doping levels were shown in FIGS. 3$a$ and 3$b$ respectively. Doping $Al_2O_3$ with 3 wt % $La_2O_3$ dopant retards $Al_2O_3$ phase transition to a phase upon thermal treatment with limited success in retaining the surface area and pore volume after calcination at 1,200° C. or higher. Thermal sintering, formation of $\alpha$ phase and the consequent dramatic decrease in surface area and pore structure, are inevitable under extremely severe condition (e.g., at 1,300° C., FIG. 2$a$ and FIG. 2$b$). Increasing the $La_2O_3$ dopant level above 3 wt % further helps to stabilize $Al_2O_3$ structure. The results in FIGS. 3$a$ and 3$b$ indicate that the optimum La loadings to achieve the highest surface area and pore volume of $La_2O_3$ modified $Al_2O_3$ are dependent of calcination temperature. For 1,200° C. calcined samples, the largest surface area and pore volume was found to be that of 5 wt % $La_2O_3$/$Al_2O_3$ (FIG. 3$a$). Optimum surface area/pore volume was achieved with 8 wt % $La_2O_3$ loading with 1,300° C. calcined $La_2O_3$/$Al_2O_3$ samples (FIG. 3$b$). With a $La_2O_3$ doping level higher than those optimum values, the surface area and pore volume decrease.

Thus, support formulation comprising 6-8 wt % $La_2O_3$ (corresponding respectively to ca. 5.1-6.8 wt % La and ca. 1.88-2.5 mol % $La_2O_3$) in the aluminum oxide matrix and calcined at 1,300° C. seemed to provide higher surface area than the unmodified alumina structure or those modified with higher or lower La loadings.

CATALYST EXAMPLE

The γ-$Al_2O_3$ spheres described above were impregnated with an aqueous solution containing desired amount of lanthanum nitrate [$La(NO_3)_3$] so that the lanthanum oxide [$La_2O_3$] amount in the final material after drying and calcinations is approximately 3% by weight. The $Al_2O_3$ spheres impregnated with the $La(NO_3)_3$ solution were dried in oven at 120° C. overnight and then calcined at 1,200° C. for 3 hours to form a $La_2O_3$-modified $Al_2O_3$ support material. The $La_2O_3$—$Al_2O_3$ spheres (Support Example S) were then subjected to samarium addition.

The $La_2O_3$-modified $Al_2O_3$ support material obtained as EXAMPLE 1 was impregnated with a samarium nitrate [$Sm(NO_3)_3$] solution. The material was dried in oven for overnight at 120° C. and then calcined at 1,100° C. for 3 hours to form a samarium-promoted catalyst support (Promoted Support Example PS). The Sm content in the catalyst was 4 wt % $Sm_2O_3$ in the final material after drying and calcinations.

The promoted catalyst support calcined was then impregnated with a rhodium chloride [$RhCl_3$] solution and the catalyst precursor was dried in oven for overnight at 120° C., calcined at 900° C. for 3 hours, and then reduced in $H_2$ at 600° C. for 3 hours to generate some metallic rhodium form before being charged into the reactor to as to form a catalyst (Catalyst Example C). The Rh metal content in the catalyst was 4% by weight again determined by mass balance.

Table 1 lists the alumina phase content, the rare earth aluminate content, BET surface areas, pore volume, average pore diameter, average pore volume and average pore diameter both measured by the BJH desorption method using $N_2$ as the adsorptive of the modified alumina catalyst support, the promoted modified support and the catalyst made therefrom.

The characterization of the transition alumina support was done by Rietveld X-Ray Diffraction. Rietveld XRD uses a modeling tool which can extrapolate the percentage of different alumina phases based on crystalline raw data from XRD. The Rietveld neutron profile refinement method is disclosed by Rietveld (*J. Appl. Cryst.*, 1969, vol. 2, pp. 65-71) and the quantitative analysis of minerals using the full powder diffraction profile using the Rietveld modeling are described in Bish & Howard (*J. Appl. Cryst.*, 1988, vol. 21, pp. 86-91). The Rietveld neutron profile of gamma-alumina and theta-alumina disclosed in Zhou et al. (Acta Cryst., 1991, vol. B47, pp. 617-630) were used as a reference for the determination of the alumina phase content in the samples.

Surface area and pore size distribution are obtained on a Micromeritics TriStar 3000 analyzer after degassing the sample at 190° C. in flowing nitrogen for five hours. Surface area is determined from ten points in the nitrogen adsorption isotherm between 0.05 and 0.3 relative pressure and calculating the surface area by the standard BET procedure. Pore size distribution is determined from a minimum of 30 points in the nitrogen desorption isotherm and calculated using the BJH model for cylindrical pores. The instrument control and calculations are performed using the TriStar software and are consistent with ASTM D3663-99 "Surface Area of Catalysts and Catalyst Carriers", ASTM D4222-98 "Determination of Nitrogen Adsorption and Desorption Isotherms of Catalysts by Static Volumetric Measurements", and ASTM D4641-94 "Calculation of Pore Size Distributions of Catalysts from Nitrogen Desorption Isotherms". The initial surface area (A) of the catalyst is the surface area of the catalyst structure prior to contact of reactant gas. The pore volume (V) of the catalyst ($N_2$ as adsorptive) is measured and calculated using the method described above. Average pore size (diameter) based on $N_2$ adsorptive is calculated as 4V/A.

For the alumina material modified with La (Example S), calcinations at 1,200° C. resulted in a mixture of gamma-$Al_2O_3$ (24 wt %), theta-$Al_2O_3$ (66 wt %) and alpha-$Al_2O_3$ (10 wt %). Addition of samarium to Example S and calcination at 900° C. (Example PS) produced a mixture of theta-$Al_2O_3$ (88 wt %) and alpha-$Al_2O_3$ (12 wt %), as the gamma-alumina phase seemed to be no longer present. The addition of rhodium to Example PS and subsequent calcination at 600° C. (Example C) consisted of theta-$Al_2O_3$ (87 wt %) and alpha-$Al_2O_3$ (13 wt %). Therefore Examples PS and C had similar alumina phase composition.

From Table 1, it is noted that calcination at 1,200° C. completely transformed gamma-$Al_2O_3$ to theta-$Al_2O_3$ or alpha-$Al_2O_3$. One also anticipates that a longer calcination time at a given temperature would also result in transforming more gamma-$Al_2O_3$ to theta-$Al_2O_3$.

TABLE 1

Surface area, pore volume, average pore diameter, and alumina phase content of support and catalyst examples after different calcination temperatures of the support.

| Ex | Composition | Support Calc. Temp., ° C. | BET SA, $m^2$/g | Pore vol., ml/g | Avg. pore size, nm | [d]$LnAl_yO_z$ With (wt %) | Estimated alumina ($Al_2O_3$) content[c] (wt %) | | |
|---|---|---|---|---|---|---|---|---|---|
| | | | | | | | γ | θ | α |
| S | $La_2O_3$—$Al_2O_3$ | 1,200 | 56 | 0.42 | 23 | 7% | 21 | 63 | 9 |
| [a]PS | 4% Sm/$La_2O_3$—$Al_2O_3$ | 1,200 | — | — | — | 20% | 0 | 68 | 10 |
| [b]C | 4% Rh/4% Sm/$La_2O_3$—$Al_2O_3$ | 1,200 | 39 | 0.35 | 30 | 18% | 0 | 66 | 10 |

[a]this sample also contained 2% of samarium oxide.
[b]this sample also contained 2% of samarium oxide and 4% rhodium.
[c]γ, θ, and α refer to gamma-alumina, theta-alumina, and alpha-alumina respectively
[d]$LnAl_yO_z$ represents a rare earth hexaaluminate-like structure with y = 11- 12 and z = 18-19, and Ln represents lanthanum, or samarium, or combinations thereof.

As the phase transformations of $Al_2O_3$ follow gamma→theta→alpha with progressive heating, the calcination temperature also has a great impact On the porous structure and support characteristics. A significant difference in surface area (143 $m^2/g$ vs. 56 $m^2/g$) and pore volume (0.75 ml/g vs. 0.44 ml/g) in unmodified untreated alumina material and Example S was observed, concurrently to the appearance of a good portion of theta-alumina phase and some alpha-alumina phase.

It is worth mentioning that additional XRD data using Rietvel modeling (Rietveld, J. Appl. Cryst., 1969, vol. 2, pp. 65-71; Bish & Howard, J. Appl. Cryst., 1988, vol. 21, pp. 86-91; Taylor, *Powder Diffraction*, 1991, vol. 6, pp. 2-9) indicated that there was no distinguished phase of $La_2O_3$ found in any of the samples, instead, two forms of rare earth alumina solid solution were found matching the spectrum. One is a random form, alumina maintained gamma or theta structures with some of aluminum atoms in the lattices randomly replaced by rare earth metal atoms. All gamma-$Al_2O_3$ and theta-$Al_2O_3$ mentioned above actually existed as such a random solid solution form of alumina and $La_2O_3$. Another one is an ordered form, a distinguished new crystallite phase formulated as $LnAl_{12}O_{19}$, which was found a significant amount in promoted support Example PS (20 wt % based on the sample weight) and catalyst Example C (18 wt % based on the sample weight), much more than support Example S (7 wt % based on the sample weight). This may suggest that addition of more rare earth element such as samarium might help form more solid solution of $LNAl_{12}O_{19}$.

Catalyst composition, metal surface area, and metal dispersion are summarized in the Table 2 below for Example C (4% Rh-4% Sm/$La_2O_3$—$Al_2O_3$).

TABLE 2

Catalyst Compositions for Example C, metal surface area, and rhodium dispersion.

| EX. | Active metal loading, wt % | Promoter loading, wt % | Metal Surface Area, $-m^2/g$ rhodium | Metal dispersion – rhodium, % |
|---|---|---|---|---|
| C | 4% Rh | 4% Sm | 0.53 | 3.0 |

The metal surface area of the catalyst is determined by measuring the dissociative chemical adsorption of $H_2$ on the surface of the metal. A Micromeritics ASAP 2010 automatic analyzer system is used, employing $H_2$ as a probe molecule. The ASAP 2010 system uses a flowing gas technique for sample preparation to ensure complete reduction of reducible oxides on the surface of the sample. A gas such as hydrogen flows through the heated sample bed, reducing the oxides on the sample (such as platinum oxide) to the active metal (pure platinum). Since only the active metal phase responds to the chemisorbate (hydrogen in the present case), it is possible to measure the active surface area and metal dispersion independently of the substrate or inactive components. The analyzer uses the static volumetric technique to attain precise dosing of the chemisorbate and rigorously equilibrates the sample. The first analysis measures both strong and weak sorption data in combination. A repeat analysis measures only the weak (reversible) uptake of the probe molecule by the sample supports and the active metal. As many as 1,000 data points can be collected with each point being fully equilibrated. Prior to the measurement of the metal surface area the sample is pretreated. The first step is to pretreat the sample in He for 1 hr at 100° C. The sample is then heated to 350° C. in He for 1 hr. These steps clean the surface prior to measurement. Next the sample is evacuated to sub-atmospheric pressure to remove all previously adsorbed or chemisorbed species. The sample is then oxidized in a 10% oxygen/helium gas at 350° C. for 30 minutes to remove any possible organics that are on the surface. The sample is then reduced at 400° C. for 3 hours in pure hydrogen gas. This reduces any reducible metal oxide to the active metal phase. The sample is then evacuated using a vacuum pump at 400° C. for 2 hours. The sample is then cooled to 35° C. prior to the measurement. The sample is, then ready for measurement of the metal surface. From the measurement of the volume of $H_2$ uptake during the measurement step, it is possible to determine the metal surface area per gram of catalyst structure by the following equation.

$$MSA=(V)(A)(S)(a)/22400/m$$

where MSA is the metal surface are in $m^2/gram$ of catalyst structure;

V is the volume of adsorbed gas at Standard Temperature and Pressure in ml.;

A is the Avogadro constant;

S is the stoichiometric factor (2 for $H_2$ chemisorption on rhodium);

m is the sample weight in grams; and a is the metal cross sectional area.

A temperature-programmed reduction (TPR) was also performed for catalyst Example 3. TPR was used to analyze the metal oxide reducibility and metal-to-support interactions. A 0.05-g sample was pretreated with flowing Argon at temperature of 200° C. for 0.5 hour and cooled down to ambient, then heated up to 800° C. in flowing 20% of $H_2/Ar$ (50 cc/min) at the ramp rate of 10° C./min. The number of reduction peaks can be used to determine the number of environments where metals reside and the temperatures can be used as indicators for metal-to-support interactions, higher temperature stronger metal-to-support interaction. The TPR profile, its peak temperatures and total $H_2$ consumption, of as-calcined Example C are shown in FIG. 1. Example C had three reduction peaks at temperatures of 122° C., 156° C. and 200° C., respectively, with total $H_2$ consumption of 9.2 ml/g. The three peaks in the TPR of Example most likely indicated that the support calcined at 1,200° C. resulted in three different kinds of support environments for rhodium to exist, which probably mean that the metal-to-support interactions are non-uniform across the catalyst surface. The lower reduction peak temperature of Example 3 indicates a weaker Rh—O bond on the surface of the catalyst, thereby most likely increasing the amount of metallic rhodium on the surface of the reaction and favoring the direct oxidation mechanism (Scheme 2) as discussed earlier.

Fixed Bed Reactivity Testing

The catalyst Example C was tested with molecular oxygen and natural gas as the hydrocarbon feed. The natural gas had a typical composition of about 93.1% methane, 3.7% ethane, 1.34% propane, 0.25% butane, 0.007% pentane, 0.01% $C_{5+}$, 0.31% carbon dioxide, 1.26% nitrogen (with % meaning volume percent). The hydrocarbon feed was pre-heated at 300° C. and then mixed with $O_2$. The reactants were fed into a fixed bed reactor at a carbon to $O_2$ molar ratio of 1.87 or a $O_2$:natural gas mass ratio of 1.05 at gas weight hourly space velocities (GHSV) of about 675,000 hr 1. The gas hourly space velocity is defined by the volume of reactant feed per volume of catalyst per hour. The partial oxidation reaction was carried out in a conventional flow apparatus using a 12.7 mm I.D. quartz insert embedded inside a refractory-lined steel vessel. The quartz insert contained a catalyst bed (comprising of 2.0 g of catalyst particles) held between two inert 80-ppi alumina foams. The reaction took place for several days at a pressure of about 90 psig (722 kPa) and at temperatures at the exit of reactor between about 930° C. and about 1010° C. All the flows were controlled by mass flow controllers. The reactor effluent as well as feedstock was analyzed using a gas chromatograph equipped with a thermal conductivity detector. Pressures at the inlet and outlet on the reactor were measured by a differential pressure transmitter, which gives the overall pressure drop across the catalytic bed by subtracting the pressure at the outlet from the pressure at the inlet.

The data analyzed include catalyst performance as determined by conversion and selectivity, and deactivation rate measured for some over a period of over 300 hours. The catalyst performances ($CH_4$ conversion, $H_2$ and CO selectivity) at 2 hours after reaction ignition are listed in the following Table 3 and the observed deactivation rate are listed in Table 4.

TABLE 3

Test data for Catalyst Example C with initial $CH_4$ conversion, CO and $H_2$ selectivity at about 24 hours of reaction.

| Catalyst Example | GHSV, $hr^{-1}$ | $CH_4$ conversion, % | CO selectivity, % | $H_2$ selectivity, % |
|---|---|---|---|---|
| C | 675,000 | 94 | 96 | 96 |

TABLE 4

Deactivation for Catalyst Example C measured over a time period for about 300+ hours at a GHSV of about 675,000 $hr^{-1}$.

| Catalyst Example | TOS, hrs | $CH_4$ conv. loss, %/day | CO sel. loss, %/day | $H_2$ sel. loss, %/day |
|---|---|---|---|---|
| C | 321 | 0.48 | 0.14 | 0.48 |

As shown in Table 3, Example C has very good overall catalytic performance towards synthesis gas production. The oxygen conversion (not shown) was also measured for all tests, and was above 99%. As seen in Table 4, Example C appears to deactivate at a slow rate, showing remarkable stability in conversion and selectivity over time.

FIG. 4 shows the plots of the methane conversion and product ($H_2$ and CO) selectivity for the test run of catalyst Example C, demonstrating the great stability in partial oxidation of natural gas, with only 0.48_% loss per day in methane conversion and 0.48_% loss per day in hydrogen selectivity for the duration of the run (about 300 hours).

The examples and testing data show that the catalyst compositions of the present invention represent an improvement over prior art partial oxidation catalysts in their ability to resist deactivation over sustained time periods while maintaining high methane conversion and hydrogen and carbon monoxide selectivity values. While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all issued patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A high temperature stable catalyst support comprising the following crystalline structures:
    an alumina phase selected from the group consisting of alpha-alumina, theta-alumina and combinations thereof;
    a rare earth aluminate of a hexaaluminate or hexaaluminate-like structure comprising at least one rare earth metal and having a high molar ratio of aluminum to rare earth metal between 11:1 and 14:1; and
    a rare earth aluminate of a perovskite or perovskite-like structure comprising the at least one rare earth metal and having a low molar ratio of aluminum to rare-earth metal of less than 2:1,
    wherein the catalyst support contains not more than 20% of alpha-alumina, and less than 100 wt % to about 1 wt % of the rare earth aluminate with the high molar ratio of aluminum to rare earth metal.

2. The catalyst support of claim 1 wherein the catalyst support comprises between 5 and 50 percent by weight of the rare earth aluminate with the high molar ratio of aluminum to rare earth metal based on the total weight of the catalyst support.

3. The catalyst support of claim 1 wherein the at least one rare earth metal is selected from the group consisting of lanthanum, neodymium, praseodymium, cerium, samarium, and combinations thereof.

4. The catalyst support of claim 1 wherein both rare earth aluminates comprise lanthanum.

5. The catalyst support of claim 1 wherein the catalyst support comprises between about 1 wt % and about 10 wt % of lanthanum as the at least one rare earth metal.

6. The catalyst support of claim 1 wherein the rare earth aluminate with the high molar ratio of aluminum to rare earth metal further comprises an element from Groups 1-14 of the Periodic Table of Elements.

7. The catalyst support of claim 1 wherein the rare earth aluminate with the high molar ratio of aluminum to rare earth metal further comprises nickel, magnesium, barium, potassium, sodium, manganese, a second rare earth metal or combinations thereof.

8. The catalyst support of claim 1 wherein the rare earth aluminate with the high molar ratio of aluminum to rare earth metal and the alumina phase are intimately mixed.

9. The catalyst support of claim 1 wherein the rare earth aluminate with the high molar ratio of aluminum to rare earth metal coats the alumina phase partially or completely.

10. The catalyst support of claim 1 wherein the rare earth aluminate with the high molar ratio of aluminum to rare earth metal has a chemical formula of $LnAl_yO_z$, where y is between 11 and 14; and z is between 18 and 23, Al and O represent aluminum atoms and oxygen atoms respectively; and where Ln comprises lanthanum, neodymium, praseodymium, samarium, or combinations thereof.

11. The catalyst support of claim 1 wherein the rare earth aluminate with the high molar ratio of aluminum to rare-earth metal has a chemical formula of $MAl_yO_z$, where y is between 11 and 12; z is between 18 and 19; Al and O represent aluminum atoms and oxygen atoms respectively; and M comprises a combination of lanthanum and samarium.

12. The catalyst support of claim 1 wherein the rare earth aluminate with the high molar ratio of aluminum to rare-earth metal comprises a lanthanum hexaaluminate.

13. The catalyst support of claim 1 further comprising an oxide of the at least one rare earth metal.

14. The catalyst support of claim 1 wherein the catalyst support has a surface area greater than 2 $m^2$/gram.

15. The catalyst support of claim 1 wherein the catalyst support has a surface area lower than 30 $m^2$/gram.

16. The catalyst support of claim 1 wherein the catalyst support comprises between 1 wt % and 10 wt % of the at least one rare earth metal.

17. The catalyst support of claim 1 wherein the catalyst support comprises between 1 and 50 percent by weight of the rare earth aluminate with the high molar ratio of aluminum to rare earth metal based on the total weight of the catalyst support.

18. The catalyst support of claim 1 wherein the catalyst support comprises more than 40 wt % and less than 100 wt % of the rare earth aluminate with the high molar ratio of aluminum to rare earth metal based on the total weight of the catalyst support.

19. The catalyst support of claim 1 wherein the catalyst support is made by impregnating a solution of the at least one rare earth metal onto an aluminum-containing precursor; and calcining at a temperature between 1,000° C. and 1,600° C.

20. The catalyst support of claim 19 wherein the aluminum-containing precursor comprises an aluminum structure selected from the group consisting of bayerite, gibbsite, boehmite, pseudo-boehmite, bauxite, gamma-alumina, delta-alumina, chi-alumina, rho-alumina, kappa-alumina, eta-alumina, theta-alumina, and combinations thereof.

21. The catalyst support of claim 19 wherein the aluminum-containing precursor comprises at least one transition alumina selected from the group consisting of gamma-alumina, delta-alumina, chi-alumina, rho-alumina, kappa-alumina, eta-alumina, and theta-alumina.

22. The catalyst support of claim 19 wherein the aluminum-containing precursor comprises gamma-alumina.

23. The catalyst support of claim 22 wherein calcining is done at a temperature between about 1200° C. and about 1,300° C.

24. The catalyst support of claim 22 wherein calcining is done at a temperature between 1,100° C. and 1,400° C.

25. A method for making a thermally stable aluminum-based catalyst support comprising:
(a) impregnating a solution of a rare earth metal onto an aluminum-containing precursor;
(b) drying the impregnated aluminum-containing precursor; and
(c) calcining at a temperature between 1,000° C. and 1,600° C. in a manner effective to convert a portion of said aluminum-containing precursor to an aluminum oxide phase comprising alpha-alumina, theta-alumina, or combinations thereof, and to convert another portion of said aluminum-containing precursor with at least a fraction of said rare earth metal to a rare earth aluminate of a hexaaluminate or hexaaluminate-like structure with a high molar ratio of aluminum to rare earth metal between 11:1 and 14:1, and further to a second rare earth aluminate of a perovskite or perovskite-like structure with a low molar ratio of aluminum to rare earth metal of less than 2:1,
such that the catalyst support comprises said rare earth aluminate with the low molar ratio of aluminum to rare-earth metal; the aluminum oxide phase comprising less than 20 wt % of alpha-alumina; and less than 100 wt % to about 1 wt % of said rare earth aluminate with the high molar ratio of aluminum to rare earth metal.

26. The method of claim 25 wherein the aluminum-containing precursor comprises an aluminum structure selected from the group consisting of bayerite, gibbsite, boehmite, pseudo-boehmite, bauxite, gamma-alumina, delta-alumina, chi-alumina, rho-alumina, kappa-alumina, eta-alumina, theta-alumina, and combinations thereof.

27. The method of claim 25 wherein the aluminum-containing precursor comprises a transition alumina selected from the group consisting of gamma-alumina, delta-alumina, chi-alumina, rho-alumina, kappa-alumina, eta-alumina, theta-alumina, and combinations thereof.

28. The method of claim 25 wherein the aluminum-containing precursor comprises gamma-alumina.

29. The method of claim 28 wherein calcining is done at a temperature between about 1,200° C. and about 1,300° C.

30. The method of claim 28 wherein calcining is done at a temperature between 1,100° C. and 1,400° C.

31. The method of claim 25 wherein the rare earth metal is selected from the group consisting of lanthanum, neodymium, praseodymium, cerium and combinations thereof.

32. The method of claim 25 wherein both rare earth aluminates comprise lanthanum.

33. The method of claim 25 wherein calcining is further effective to further convert another portion of the rare earth metal solution into an oxide of said rare earth metal, said rare earth oxide consisting essentially of rare earth metal atoms and oxygen atoms.

34. The method of claim 25 wherein the solution of rare earth metal comprises more than one rare-earth metal.

35. The method of claim 25 wherein the rare earth aluminate with the high molar ratio of aluminum to rare earth metal comprises a lanthanum hexaaluminate.

36. The method of claim 25 wherein the catalyst support comprises between about 0.5 and about 10 percent by weight of the rare earth metal based on the total weight of the catalyst support.

37. The method of claim 25 wherein the catalyst support comprises between about 5 and about 50 percent by weight of the rare earth aluminate with the high molar ratio of aluminum to rare earth metal based on the total weight of the catalyst support.

38. The method of claim 25 wherein the catalyst support comprises between about 1 and about 50 percent by weight of the rare earth aluminate with the high molar ratio of aluminum to rare earth metal based on the total weight of the catalyst support.

39. The method of claim 25 wherein the catalyst support comprises more than 40 wt % and less than 100 wt % of the rare earth aluminate with the high molar ratio of aluminum to rare earth metal.

40. A partial oxidation catalyst comprising:
(a) an active ingredient comprising a rhodium alloy or a metal selected from the group consisting of rhodium, iridium, ruthenium and combinations thereof, wherein, when the active ingredient comprises rhodium, said rhodium being is in an amount of from about 0.1 wt % to about 20 wt % based on the total catalyst weight; and
(b) a support onto which the active ingredient is dispersed, said support comprising
an alumina phase selected from the group consisting of alpha-alumina, theta-alumina and combinations thereof;

a rare earth aluminate of a hexaaluminate or hexaaluminate-like structure comprising a rare-earth metal and having a high molar ratio of aluminum to rare earth metal between 11:1 and 14:1; and a rare earth aluminate of a perovskite or perovskite-like structure comprising the rare-earth metal and having a low molar ratio of aluminum to rare earth metal of less than 2:1, wherein the support comprises less than 100 wt % to about 1 wt % of said rare earth aluminate with the high molar ratio of aluminum to rare earth metal based on the total weight of the support.

41. The partial oxidation catalyst of claim 40 wherein the rare earth aluminate with the high molar ratio of aluminum to rare earth metal comprises a lanthanide hexaaluminate, and the lanthanide metal is selected from the group consisting of lanthanum, neodymium, praseodymium, samarium, and combinations thereof.

42. The partial oxidation catalyst of claim 41 wherein the lanthanide hexaaluminate comprises a lanthanide metal selected from the group consisting of lanthanum, neodymium, praseodymium, and combinations thereof.

43. The partial oxidation catalyst of claim 41 wherein the lanthanide hexaaluminate comprises lanthanum.

44. The partial oxidation catalyst of claim 40 wherein the rare earth metal is selected from the group consisting of lanthanum, neodymium, praseodymium, and combinations thereof.

45. The partial oxidation catalyst of claim 40 wherein both rare earth aluminates comprise lanthanum.

46. The partial oxidation catalyst of claim 40 wherein the rare earth aluminate with the high molar ratio of aluminum to rare earth metal comprises more than one rare-earth metal.

47. The partial oxidation catalyst of claim 40 wherein the support has a surface area greater than 2 m$^2$/gram.

48. The partial oxidation catalyst of claim 40 wherein the support comprises between about 5 and about 50 percent by weight of the rare earth aluminate with the high molar ratio of aluminum to rare-earth metal based on the total weight of the support.

49. The partial oxidation catalyst of claim 40 wherein the support comprises between about 1 and about 50 percent by weight of the rare earth aluminate with the high molar ratio of aluminum to rare earth metal based on the total weight of the support.

50. The partial oxidation catalyst of claim 40 wherein the support comprises more than 40 wt % and less than 100 wt % of the rare earth aluminate with the high molar ratio of aluminum to rare earth metal based on the total weight of the support.

51. The catalyst support of claim 40 wherein the support comprises not more than about 20 wt % alpha-alumina.

52. The catalyst of claim 40 wherein the partial oxidation catalyst comprises a rhodium alloy, said rhodium alloy comprising a metal selected from the group consisting of ruthenium, iridium, platinum, palladium, tantalum, niobium, molybdenum, rhenium, tungsten, cobalt, and zirconium.

53. The catalyst of claim 40 wherein the partial oxidation catalyst comprises between about 0.5 wt % and about 10 wt % of rhodium.

54. A method for making synthesis gas comprising:
converting a gaseous hydrocarbon stream and an oxygen-containing stream over a partial oxidation catalyst, to make a product stream comprising CO and H$_2$,
wherein said partial oxidation catalyst includes
an active ingredient comprising a rhodium alloy or a metal selected from the group consisting of rhodium, iridium, ruthenium, and combinations thereof, wherein, when the active ingredient comprises rhodium, said rhodium is in an amount of from about 0.1 wt % to about 20 wt % based on the total catalyst weight; and a support onto which the active ingredient is dispersed, said support comprising
an alumina phase selected from the group consisting of alpha-alumina, theta-alumina and combinations thereof;

a rare earth aluminate of a hexaaluminate or hexaaluminate-like structure comprising a rare earth metal and having a high molar ratio of aluminum to rare earth metal between 11:1 and 14:1; and a rare earth aluminate of a perovskite or perovskite-like structure comprising the rare-earth metal and having a low molar ratio of aluminum to rare earth metal of less than 2:1;

wherein the support comprises less than 100 percent to about 1 percent by weight of said rare earth aluminate with the high molar ratio of aluminum to rare earth metal based on the total weight of the support.

55. The method of claim 54 wherein the support comprises between about 1 and about 50 percent by weight of said rare earth aluminate with the high molar ratio of aluminum to rare earth metal based on the total weight of the support.

56. The method of claim 54 wherein the rare earth metal is selected from the group consisting of lanthanum, neodymium, praseodymium, cerium, and combinations thereof.

57. The method of claim 54 wherein the rare earth aluminate with the high molar ratio of aluminum to rare earth metal comprises lanthanum.

58. The method of claim 54 wherein the support comprises between about 1 and about 10 percent by weight of lanthanum based on the total weight of catalyst support.

59. The method of claim 54 wherein the rare earth aluminate with the high molar ratio of aluminum to rare earth metal comprises lanthanum and samarium.

60. The method of claim 54 wherein the rare earth aluminate with the high molar ratio of aluminum to rare earth metal and the alumina phase are intimately mixed.

61. The method of claim 54 wherein the rare earth aluminate with the high molar ratio of aluminum to rare earth metal coats the alumina phase partially or completely.

62. The method of claim 54 wherein the rare earth aluminate with the high molar ratio of aluminum to rare earth metal comprises a lanthanum hexaaluminate.

63. The method of claim 54 wherein the support comprises between about 1 wt % and about 10 wt % of the rare earth metal.

64. The method of claim 55 wherein the conversion is done at a GHSV between about 20,000 hr$^{-1}$ to about 100,000,000 hr$^{-1}$.

65. The method of claim 54 wherein the conversion is done at a temperature between about 350° C. to about 2,000° C.

66. The method of claim 54 wherein the conversion is done at a pressure between about 100 kPa to about 4,000 kPa.

67. The method of claim 54 wherein the hydrocarbon stream comprises natural gas.

68. The method of claim 54 wherein the hydrocarbon stream comprises at least about 50% by volume of methane.

69. The method of claim 54 wherein the partial oxidation catalyst comprises rhodium.

70. The method of claim 69 wherein the partial oxidation catalyst comprises between about 0.5 wt % and about 10 wt % of rhodium.

71. The method of claim 69 wherein the partial oxidation catalyst has a rhodium surface area greater than about 0.5 m²/g.

72. The method of claim 69 wherein the partial oxidation catalyst further comprises samarium.

73. The method of claim 54 wherein the catalyst exhibits hydrocarbon conversion of equal to or greater than about 85%.

74. The method of claim 54 wherein the partial oxidation catalyst has a hydrogen selectivity equal to or greater than about 85%.

75. The method of claim 54 wherein the product stream comprising CO and $H_2$ has a $H_2$:CO molar ratio between about 1:4:1 and 2.3.

76. The method of claim 54 wherein at least a portion of the product stream comprising CO and $H_2$ is further converted to hydrocarbons.

77. A partial oxidation catalyst comprising:
(a) an active ingredient comprising rhodium or a rhodium alloy, said rhodium alloy comprising rhodium and a metal selected from the group consisting of ruthenium, iridium, platinum, palladium, tantalum, niobium, molybdenum, rhenium, tungsten, cobalt, and zirconium, said rhodium being in an amount of from 0.1 wt % to about 20 wt % based on the total catalyst weight; and
(b) a support onto which the active ingredient is dispersed, said support comprising:
an alpha-alumina phase;
less than 100 percent to about 1 percent by weight of a rare earth aluminate of a hexaaluminate or hexaaluminate-like structure, with a high molar ratio of aluminum to rare-earth metal between 11:1 and 14:1, and comprising at least one rare earth metal selected from the group consisting of lanthanum, neodymium, praseodymium, samarium, and combinations thereof, and
a rare earth aluminate of a perovskite structure comprising the at least one rare earth metal with a low molar ratio of aluminum to rare-earth metal of less than 2:1.

78. The partial oxidation catalyst of claim 77 wherein the rare earth aluminate with the high molar ratio of aluminum to rare-earth metal comprises between 5 and 45 percent by weight of the total weight of the catalyst support.

79. The partial oxidation catalyst of claim 77 wherein the rare earth aluminate with the high molar ratio of aluminum to rare-earth metal comprises more than 40 percent and less than 100 percent by weight of the total weight of the catalyst support.

80. The partial oxidation catalyst of claim 77 wherein the partial oxidation catalyst comprises between about 0.5 wt % and about 10 wt % of rhodium.

81. The partial oxidation catalyst of claim 77 wherein the partial oxidation catalyst comprises rhodium and has a rhodium surface area greater than about 0.5 m²/g rhodium.

* * * * *